United States Patent [19]

Ueda et al.

[11] Patent Number: 4,791,582
[45] Date of Patent: Dec. 13, 1988

[54] POLYGON-FILLING APPARATUS USED IN A SCANNING DISPLAY UNIT AND METHOD OF FILLING THE SAME

[75] Inventors: Tomoaki Ueda, Kyoto; Takashige Kai; Tatsuhiko Osaka, both of Kusatsu; Kazuo Nishiguchi, Yasu, all of Japan

[73] Assignee: Daikin Industries, Ltd., Osaka, Japan

[21] Appl. No.: 911,551

[22] Filed: Sep. 25, 1986

[30] Foreign Application Priority Data

Sep. 27, 1985 [JP] Japan .................................. 60-215771
Sep. 27, 1985 [JP] Japan .................................. 60-215772
Sep. 27, 1985 [JP] Japan .................................. 60-215774
Oct. 1, 1985 [JP] Japan .................................. 60-218914

[51] Int. Cl.$^4$ ........................................... G06F 15/72
[52] U.S. Cl. .................... 364/522; 364/521; 364/518; 340/729; 340/744; 340/747
[58] Field of Search ................. 364/518, 522, 521; 340/744, 724, 723, 747, 750, 729, 728, 726, 709

[56] References Cited

U.S. PATENT DOCUMENTS

| | | | |
|---|---|---|---|
| 4,368,463 | 1/1983 | Quilliam ........................... | 340/744 |
| 4,481,594 | 11/1984 | Staggs et al. ..................... | 364/521 |
| 4,590,465 | 5/1986 | Fuchs ................................ | 340/723 |
| 4,626,838 | 12/1986 | Tsujioka et al. .................. | 340/744 |
| 4,646,076 | 2/1987 | Wiedenman et al. ............. | 340/747 |
| 4,646,078 | 2/1987 | Knierim et al. ................... | 340/750 |
| 4,646,134 | 2/1987 | Komatsu et al. .................. | 358/11 |
| 4,648,045 | 3/1987 | Demetrescu ...................... | 364/518 |
| 4,667,306 | 5/1987 | Smith ................................ | 340/724 |
| 4,677,576 | 6/1987 | Berlin, Jr. et al. ................ | 364/522 |
| 4,710,876 | 12/1987 | Cline et al. ....................... | 364/414 |
| 4,758,965 | 7/1988 | Liang et al. ...................... | 364/518 |

Primary Examiner—Gary V. Harkcom
Assistant Examiner—Randy W. LaCasse
Attorney, Agent, or Firm—Beveridge, DeGrandi & Weilacher

[57] ABSTRACT

A polygon-filling apparatus discriminates whether the polygon marks off ony one continuous lot of each scanning line according to a number of maximal values and a number of minimal values in a direction perpendicular to a scanning line and which transforms polygons discriminated as marking off two or more continuous lots on each scanning line to obtain only polygons marking off one continuous lot of each scanning line. The apparatus detects other apexes from any apex of the obtained polygon corresponding to maximum and minimum co-ordinate values in a direction perpendicular to the scanning line and paints a predetermined region according to ridge data on the left and right sides of each scanning line. The ridge data are obtained by interpolation between data indicative of neighoring apexes chained from apexes having maximum and minimum values.

10 Claims, 20 Drawing Sheets

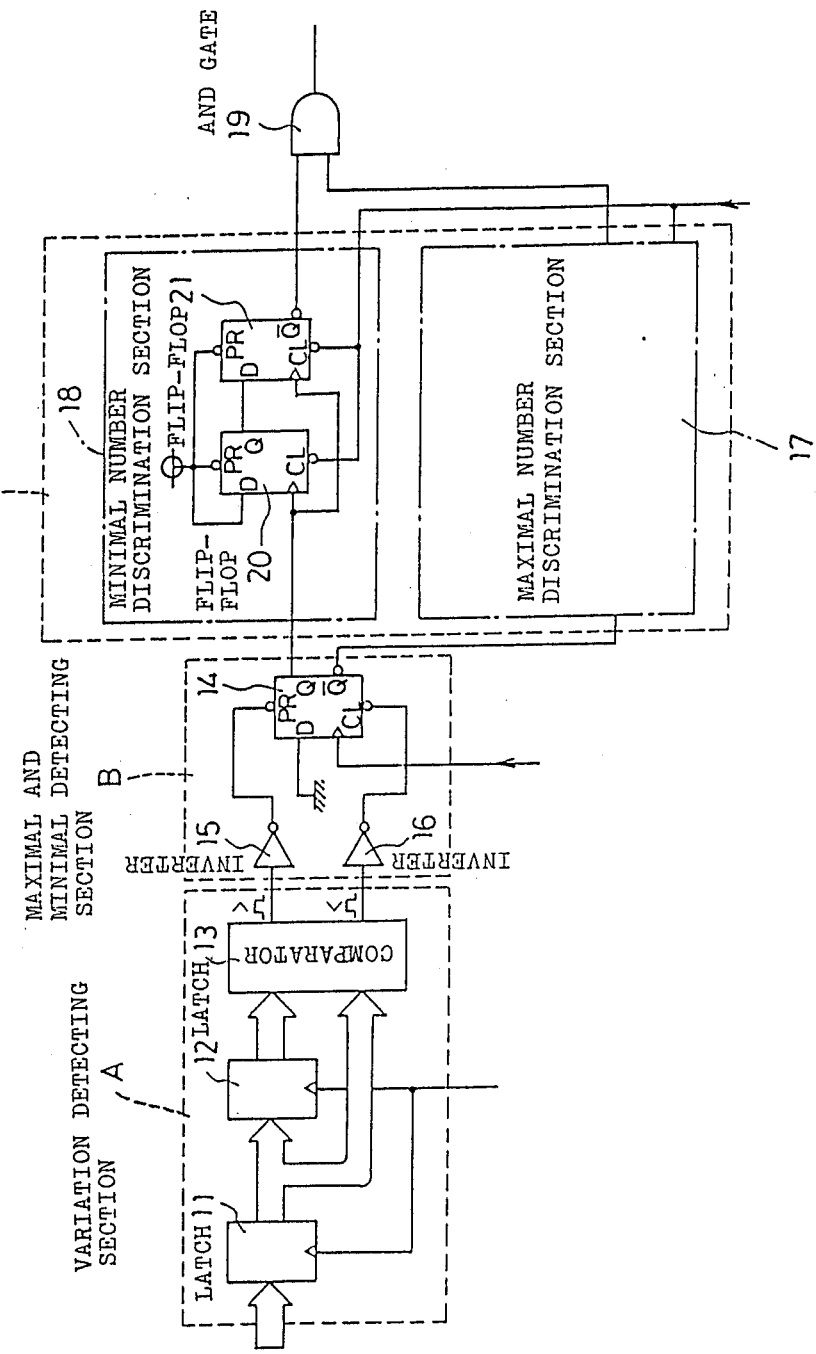

Fig. 4

| ROW ADDRESS | COLUMN ADDRESS | | | |
| --- | --- | --- | --- | --- |
| | 0 | 1 | 2 | 3 |
| 0 | CORNER NUMBER OF POLYGON | | | |
| 1 | x0 | y0 | z0 | l0 |
| 2 | x1 | y1 | z1 | l1 |
| 3 | x2 | y2 | z2 | l2 |
| ... | ...... | ..... | ...... | ...... |
| n | xn-1 | yn-1 | zn-1 | ln-1 |
| n+1 | MAXIMUM VALUE POINTER | MINIMUM VALUE POINTER | — | — |
| n+2 | NEXT POLYGON | ...... | ...... | ...... |

Fig. 14
(A)
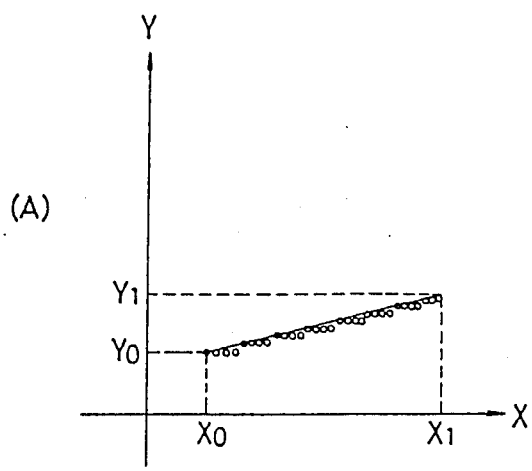
(B)
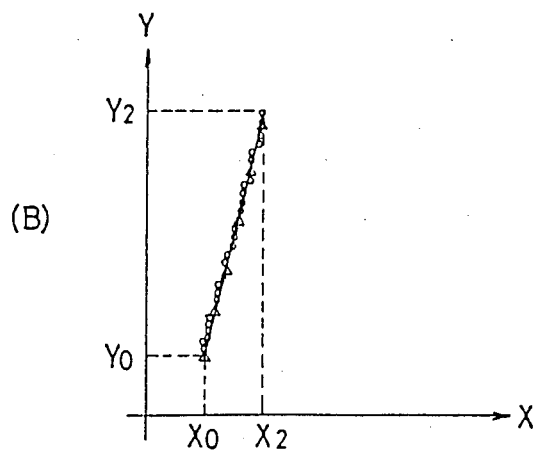

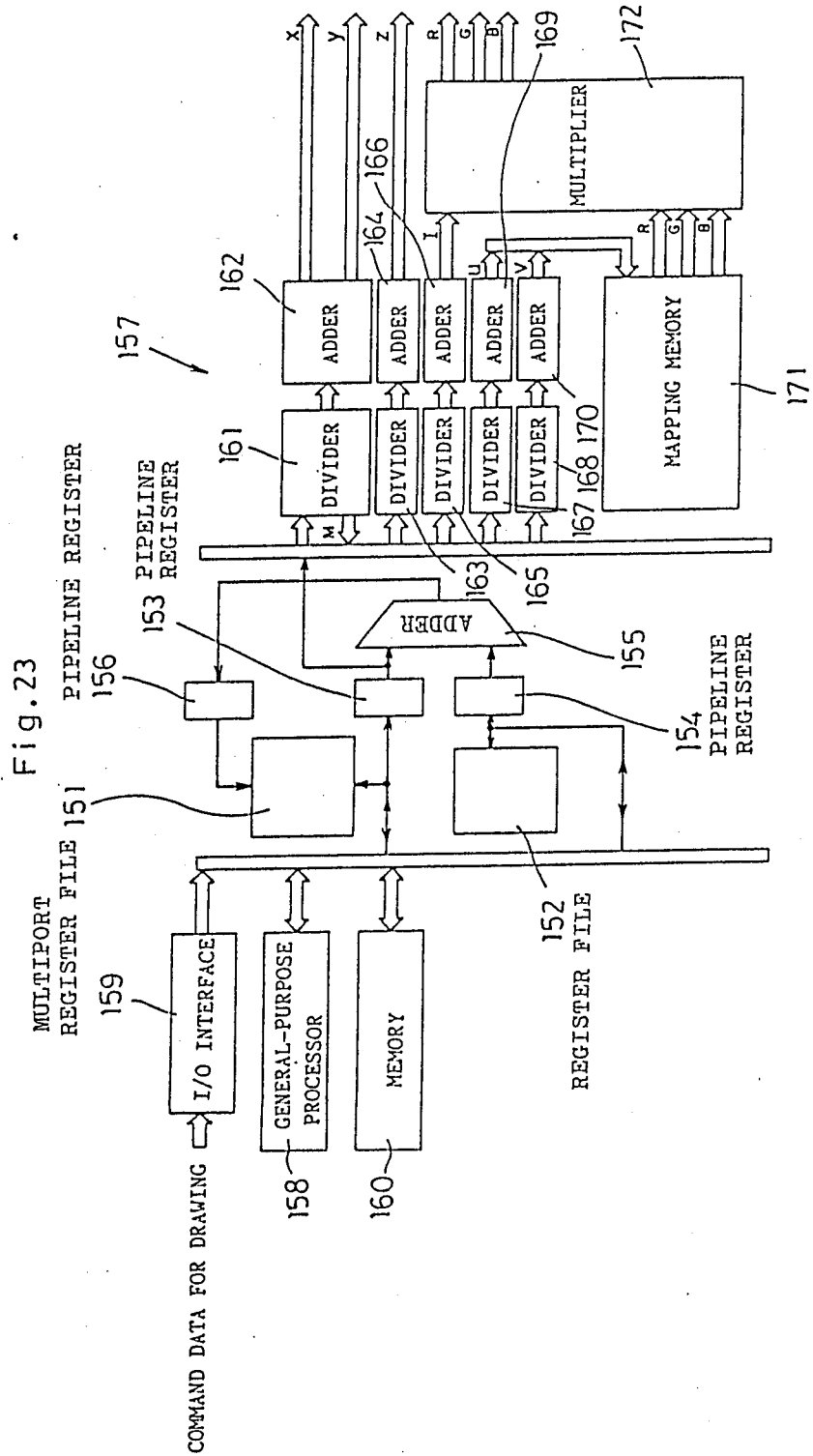

POLYGON-FILLING APPARATUS USED IN A SCANNING DISPLAY UNIT AND METHOD OF FILLING THE SAME

BACKGROUND OF THE INVENTION

The present invention relates to a filling apparatus for filling an interior of a polygon drawn with a single stroke displayed on a scanning display unit.

In a graphic display unit displaying graphic data on a scanning display, or the like, there hitherto has been adopted a filling method for filling an interior of a polygon drawn with a single stroke displayed on a display unit, so as to visually recognize the polygon easier.

In the scanning display mentioned above, there are a variety of shapes of the polygon to be filled on the scanning display, and such polygons can be classified roughly into two groups, one group of which contains, as shown in FIG. 10, a shape marking off only one lot of each scanning line (hereinafter referred to as an A-type polygon), and the other of which contains, as shown in FIG. 11, a shape marking off two or more lots of each scanning line (hereinafter referred to as a B-type polygon).

As far as the A-type polygon is concerned, the polygon can be filled on the display by simply filling a region between intersection points of the scanning line and the side lines of the polygon, while as to the B-type polygon, there exists two or more pairs of intersection points of the scanning line and the side lines of the polygon. Thus, there is a need to discriminate specific lots, to be filled among lots each of which lies between intersection points in order to grasp the shape of the figure.

Considering the above points, a filling method is conventionally adopted as in the following.

(1) A method to fill an interior of a polygon is known to those skilled in the art as a water filling method. This method comprises sorting apex-data of a polygon along an operation-direction perpendicular to a direction of a scanning line, sorting along the direction of the scanning line if necessary, making a list of ridges on sides of the polygon, each side having intersection points with the scanning line, interpolating between corresponding ridges from a starting point to an ending point, and repeating the above-mentioned list-making process on all of the scanning lines to interpolate between corresponding ridges.

By the filling method mentioned above, any of A-type polygon and B-type polygon can be surely filled in the interior thereof.

However, in the above filling method, a sorting process along an operation direction is indispensable, and a ridge list must be made as a subject of calculation, thus there arises a problem that memories must be provided for sorting and maintaining the list.

Further, a number of processes must be handled by a central processing unit (hereinafter referred to as CPU) such as reading data, sorting, processing for execution, writing data, thereby a problem also arises that it takes a long time to display the filled polygon on the scanning display after apex-data for the polygon have been given.

(2) Another method of filling a polygon is provided only for filling an interior of an A-type polygon shown in FIG. 10, by preparing independently of the image memory for indication, a memory plane for working, drawing sides of the single-stroked polygon in the memory plane for working at the same time as drawing the same in the image memory for indication, and detecting the maximum value and the minimum value in a direction of certain coordinates of the closed loop data, wherein the above-mentioned closed loop data indicates a closed loop of a polygon where neighbouring apexes are interpolated on the basis of data of each apex of the polygon. While the closed loop data are read by scanning the memory plane for working only in a region determined from the maximum value and the minimum value, points are obtained where every scanning line intersects the closed loop, and a specific logical signal is written in the image memory or in the memory plane for working in correspondence with a pair of points of intersection, thereby generating plane image data where a region marked off by the closed loop is filled with specific data (see Japanese Patent Laid Open Publication No. 3069/1980, and Japanese Patent Laid Open Publication No. 3070/1980).

The above filling method, however, involves a problem in that there is provided only one circuit for linear interpolation, and a special memory independent of the image memory must be provided for plane-display, because it is unknown from which apex the interpolation of each ridge of the polygon should be started, by the given plural apex-data. The amount of the above-mentioned special memory becomes large. A still further problem is that it takes a long time to display a filled polygon on the scanning display after apex-data of the polygon have been given. This is because a long time is spent in reading data from the memory and writing data to the memory for plane-display and also a long time is spent in searching for a starting point and an ending point on the processing scanning line for interpolation, thereby the linear interpolation circuit remains in a "wait" state for fairly a long time.

(3) Still another filling method can be adopted wherein the aforementioned method (1) is adopted when the polygon to be filled is a B-type polygon, and the aforementioned method (2) is adopted when the polygon to be filled is an A-type polygon.

In such a method, a polygon can be filled without fail regardless of whether it is an A-type or B-type, and a necessary time for the filling process can be shortened as a whole.

However, the choice of which method (1) or (2) should be adopted for filling depends on the judgement of the user or operator. In the case that the user misjudges, a filling process is performed under an unsuitable filling method. Therefore, this method (3) involves a problem that a high speed filling process cannot be realized, and another problem is that a sure filling process might not be performed.

SUMMARY OF THE INVENTION

An object of the invention is to shorten the time required for displaying a polygon the interior of which is filled on a scanning display after apex-data of the polygon are given.

Another object of the invention is to perform a filling process in a high speed only on an A-type polygon by discriminating the polygon as having apex data which indicates that it is A-type.

Still another object of the invention is to perform a filling process in a high speed on a whole polygon by transforming the B-type polygon into A-type polygons by a crushing process, when the polygon having apex-data is discriminated to be B-type.

A further object of the invention is to reduce a necessary amount of working memories for filling a polygon.

Still a further object of the invention is to perform a whole filling process in higher speed by reducing processes which depend on software so that most processes are performed by hardware.

The above objects are accomplished by providing a polygon-filling apparatus which comprises a list memory to store apex-data of a polygon which have been sequentially transferred thereto; a means to obtain a number of apexes according to the apex-data of the polygon, said apexes corresponding respectively to a locally maximal value and a locally minimal value along a direction perpendicular to a scanning line; a polygon discriminating means to discriminate a polygon based upon said number of the maximal points and the minimal points, whether said polygon is one marking off one continuous lot on each scanning line, or one capable of marking off two or more continuous lots on each scanning line; a means to detect apexes from any other apex which correspond to the maximum value and the minimum value on coordinates in a direction perpendicular to the scanning direction, respectively, based upon the apex-data of the polygon which has been discriminated to mark off only one continuous lot on each scanning line by said polygon discriminating means; a means to generate ridge data on the left side and the right side on each scanning line by independently interpolating between data of neighboring apexes chained along the left side and the right side of the polygon, respectively, from the apex having the maximum value to the apex having the minimum value, or generate ridge data on the left side and the right side on each scanning line by independently interpolating between data of neighboring apexes chained along the left side and the right side of the polygon, respectively, from the apex having the minimum value to the apex having the maximum value; and a means to display the scanning line by filling a specific region of each scanning line between points where the scanning line intersects both ridge lines.

In accordance with the polygon-filling apparatus of the invention, apex-data of a polygon are stored in the list memory in the order of transfer, i.e., in the order of tracking a locus of stroke, the numbers of maximal and minimal points are respectively obtained along a direction perpendicular to the scanning line to discriminate an A-type polygon when the polygon has one maximal point and one minimal point.

In the polygon which has been discriminated to be an A-type polygon, apexes are detected which correspond to the maximum and the minimum values of coordinates along a direction perpendicular to the scanning line, and ridge data are obtained along one side of the apex in the order of storing data in the list memory by interpolating apex-data of neighboring apexes from the apex having the maximum (or minimum) value to the apex having the minimum (or maximum) value.

On the other hand, other ridge data are obtained along another side of the apex in the reverse order of storing data in the list memory by interpolating apex-data of neighbouring apexes from the apex having the maximum (or minimum) value to the apex having the minimum (or maximum) value.

The interior of the polygon is filled by filling a thus determined part of each scanning line corresponding to the lot between the ridges on both sides.

The above and the other objects, advantages and novel characteristics of the invention will become apparent from the following description taken in conjunction with the accompanying drawings.

BRIEF DESCRIPTION OF THE DRAWINGS

FIG. 2 is a detailed diagram illustrating a detecting circuit for detecting the numbers of maximal and minimal points;

FIG. 4 is a diagram illustrating a storage in a list memory

FIGS. 9-1 to 9-3 represent block diagram of an alternate embodiment of the present invention;

FIG. 14 is a graph useful in understanding linear interpolation;

FIG. 23 is a block diagram of still another embodiment of the invention.

DETAILED EXPLANATION OF THE PREFERRED EMBODIMENTS

Figure 1:
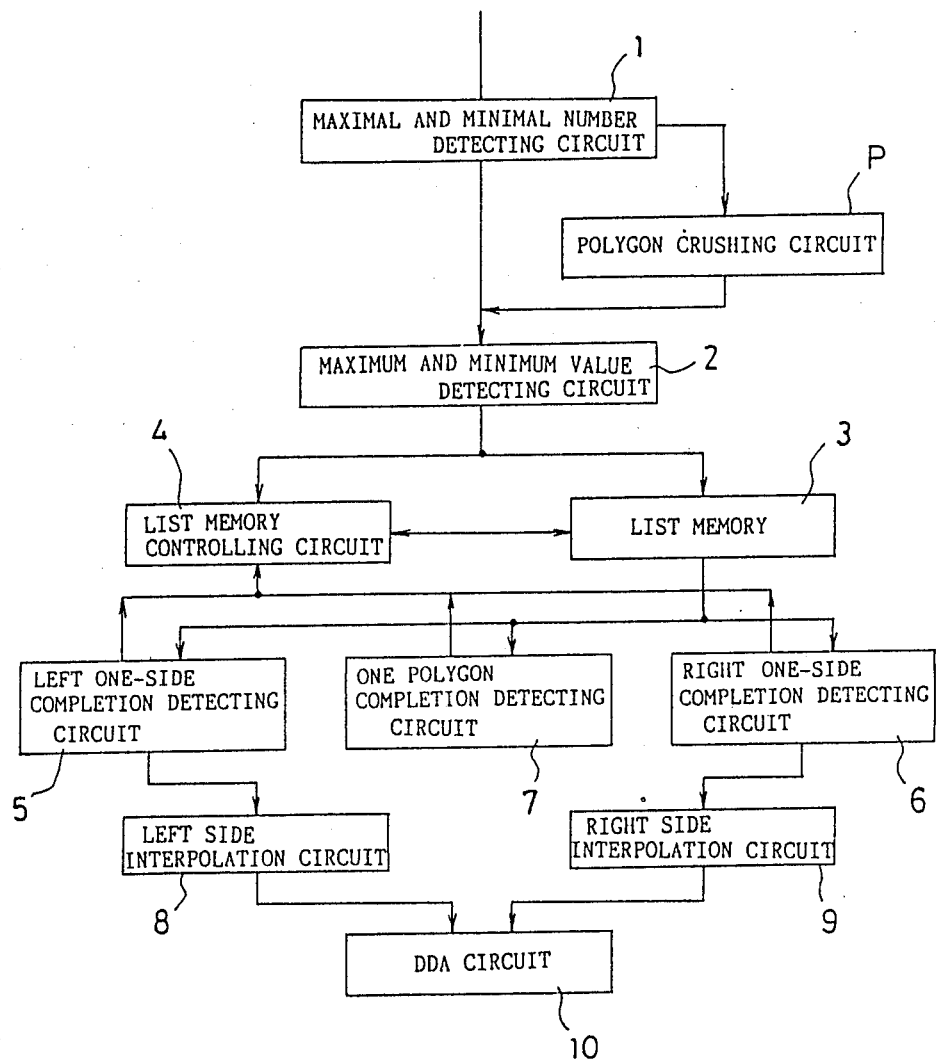
FIG. 1 is a block diagram illustrating an embodiment of the invention for performing filling of a polygon.
Figure 10:
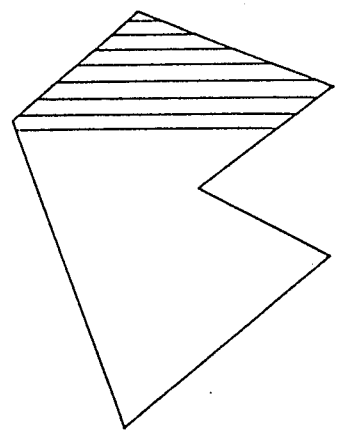
FIGS. 10 and 11 are diagrams illustrating different types of polygons.
Figure 11:
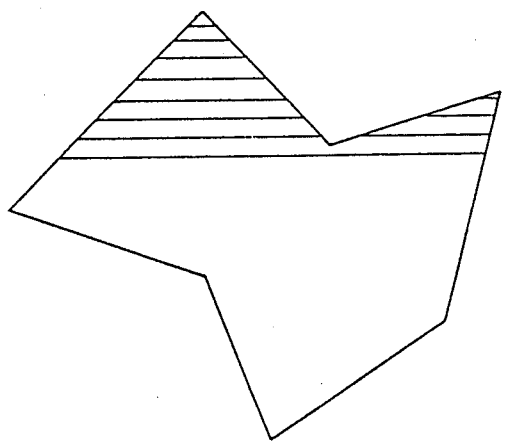

With reference to FIG. 1, a polygon-filling apparatus of the invention includes a maximal and minimal number detecting circuit 1 to which is supplied graphic data (e.g. data indicating the coordinates and luminance of each apex of a polygon as shown in FIG. 10 or FIG. 11) processed by coordinate transformation, clipping, and the like, a crushing circuit P for crushing a shape of a polygon, a maximum and minimum value detecting circuit 2 to which is supplied the above-mentioned graphic data intact or the outputted graphic data from the above crushing circuit P, a list memory 3, and a list memory controlling circuit 4.

Apex-data read from the list memory 3 under control of the list memory controlling circuit 4 are supplied to a left one-side completion detecting circuit 5, a right one-side completion detecting circuit 6, and a one polygon completion detecting circuit 7, as well as to a left side interpolation circuit 8 and a right side interpolation circuit 9. Interpolation data from the above left side interpolation circuit 8 and the right side interpolation circuit 9 are supplied to a DDA circuit (linear interpolation drawing circuit) 10. Completion detecting signals from the above left one-side completion detecting circuit 5, right one-side completion detecting circuit 6 and one polygon completion detecting circuit 7 are supplied to the above list memory controlling circuit 4.

The numbers of maximal and minimal points are detected by the maximal and minimal number detecting circuit 1 on the basis of graphic data having been processed by coordinate transformation, clipping, and the like, and each number thus obtained is discriminated to be one or not, that is, an A-type polygon or a B-type polygon. In the case that a polygon is judged to be A-type based upon the detection signal, the above graphic data are supplied to the maximum and minimum value detecting circuit 2 as they are, then apexes respectively having the maximum and minimum values of coordinates along a direction perpendicular to the scanning line are detected. On the contrary, when the polygon is judged to be B-type, the data are supplied to the polygon crushing circuit P, and the polygon is crushed into A-type polygons, then the data are supplied to the maximum and minimum value detecting circuit 2.

The data indicating the apexes which are detected by the maximum and minimum value detecting circuit 2 are written in the list memory 3 immediately after the apex-data of the A-type polygon are written in the list memory 3.

Next, apex-data are read from the list memory 3 under control of the list memory controlling circuit 4 and supplied to the left one-side completion detecting circuit 5, right one-side completion detecting circuit 6 and one polygon completion detecting circuit 7, thereby detecting completion of the process along one side on the left of polygon, one side on the right of polygon and the whole sides of polygon. Before detecting the completion of the above process, the apex-data are supplied to the left side interpolation circuit 8 and the right side interpolating circuit 9 to interpolate both the left side and the right side thereby generating ridge data, respectively.

Each of the ridge data are supplied to the DDA circuit 10, and the lot of each scanning line lying between both ridge lines are filled, so that the interior of the A-type polygon can be filled.

Figures 1, 9:
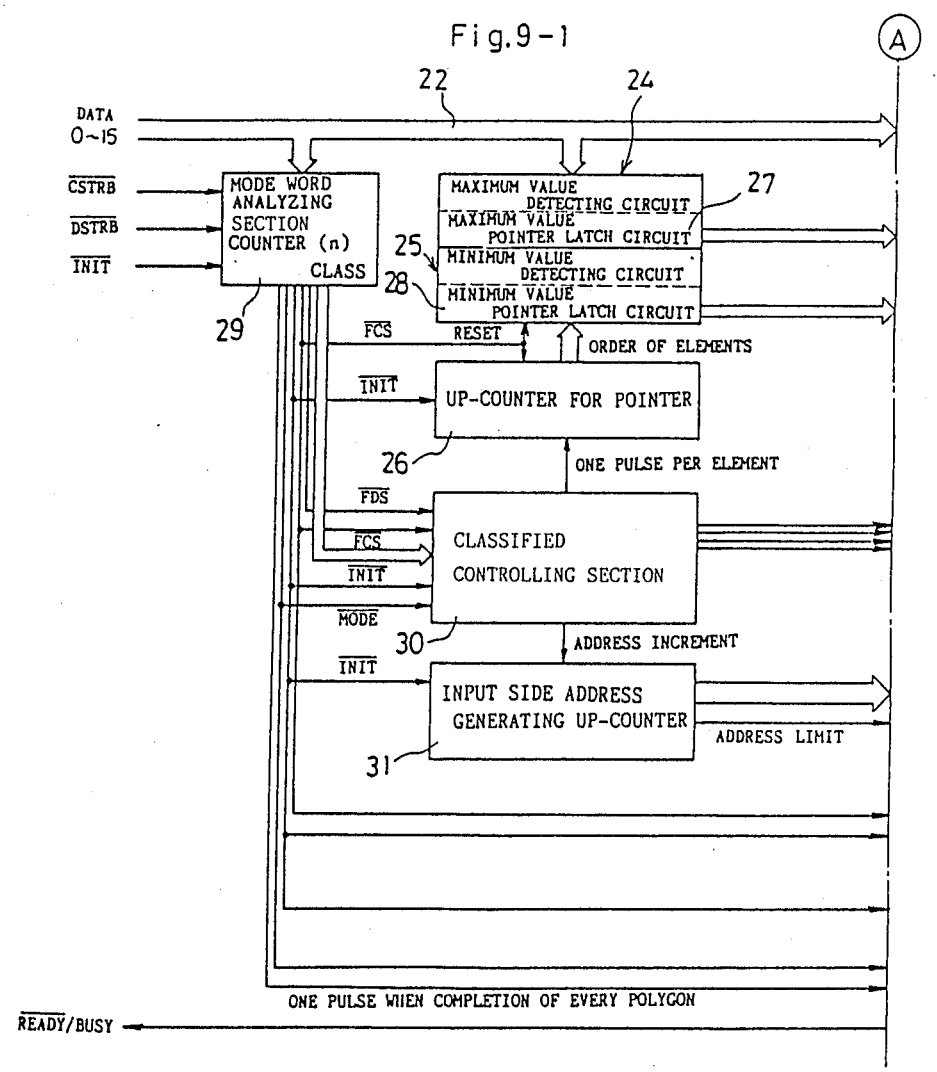
Figures 2, 9:
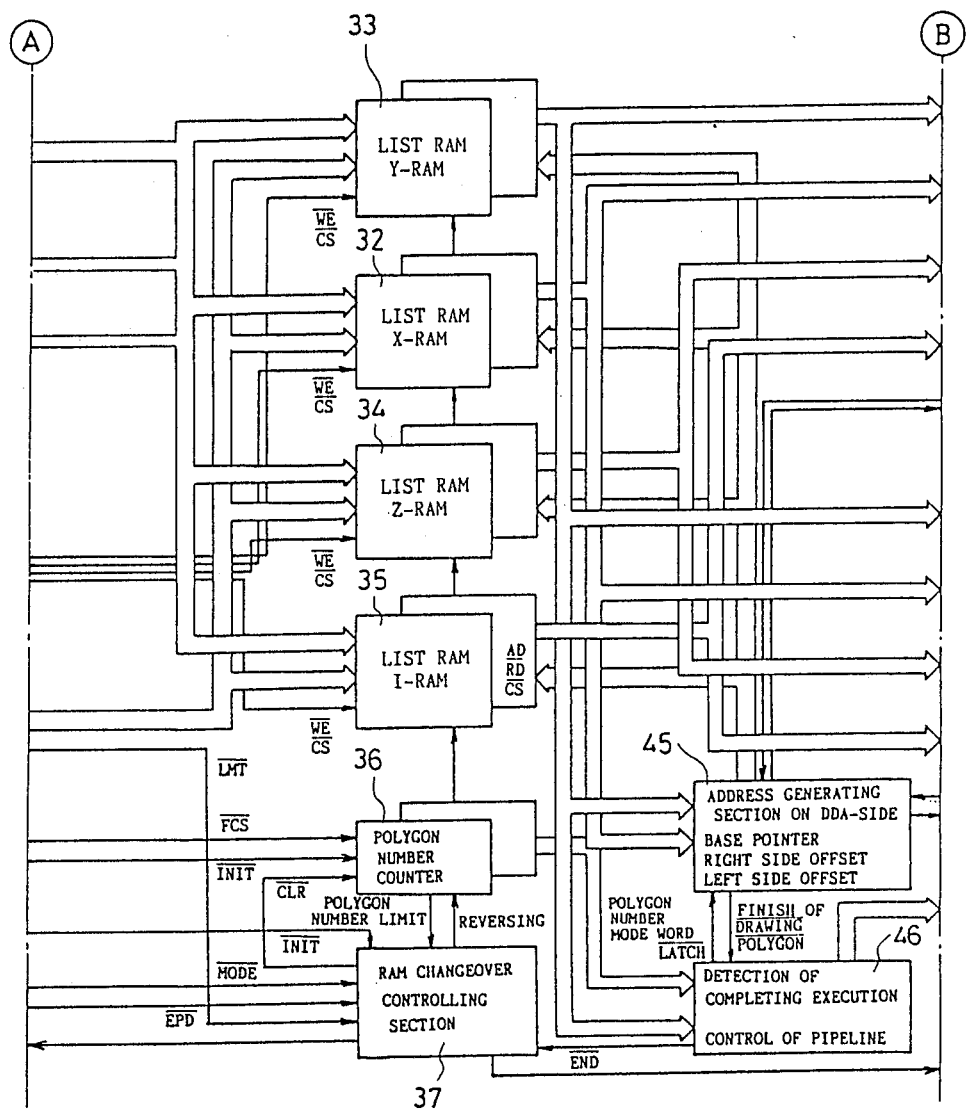
Figures 3, 9:
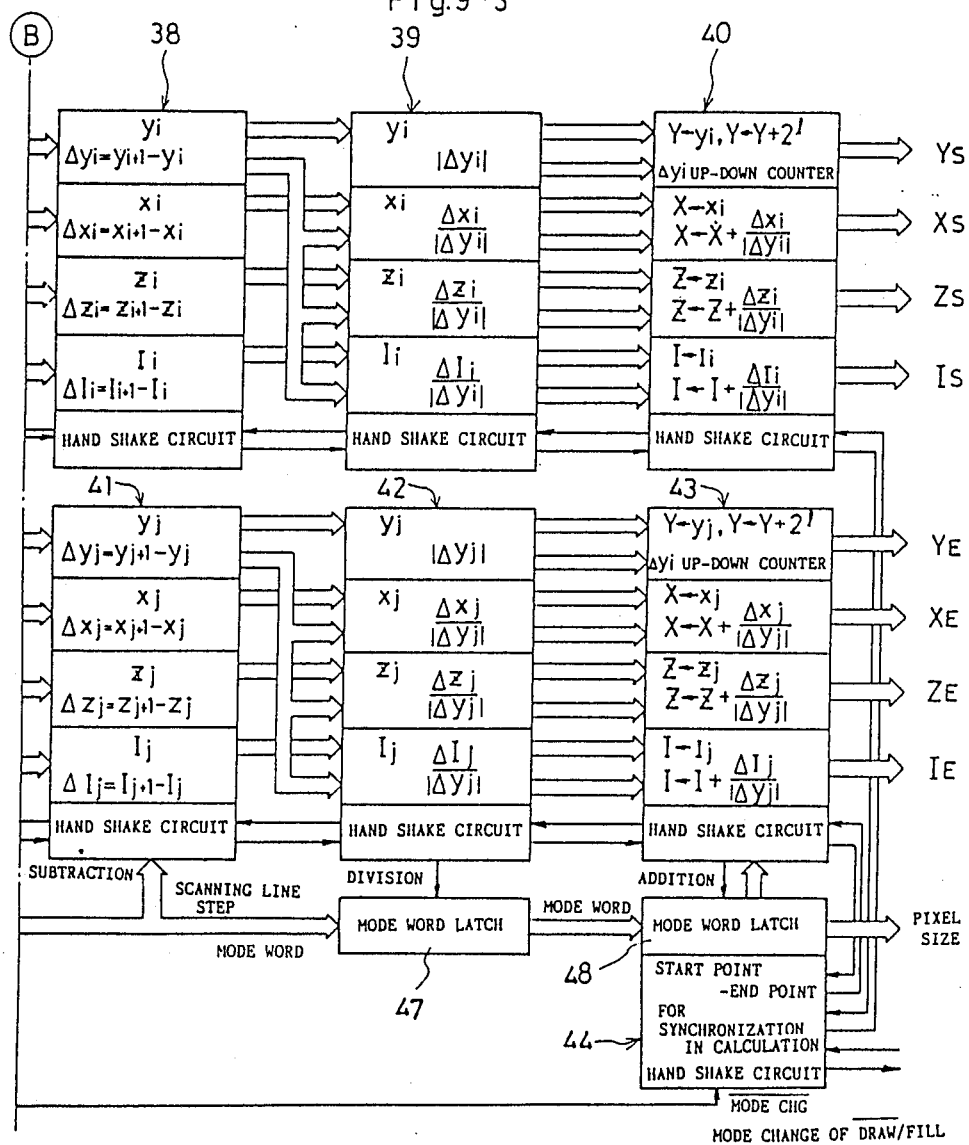

The maximal and minimal number detecting circuit 1 is, as shown in FIG. 2, so constituted that the graphic data processed with coordinate transformation, clipping and the like are inputted in a variation detecting section A so that increasing or decreasing conditions are detected. The obtained variation detecting signal is inputted in the maximal and minimal detecting section B, and the maximum and the minimum are detected. The obtained maximal and minimal detection signal is inputted in the number discriminating section C, and the sum of the numbers of maximal and minimal is discriminated to be two or less, or not.

In detail, the variation detecting section A comprises a latch circuit 11 at a first stage, a latch circuit 12 at a second stage and a comparator 13. When the latch circuit 11 at the first stage is inputted with data of the y-coordinate of the i-th apex, the latch circuit 12 at the second stage is inputted with data of y-coordinate of the (i−1)-th apex. The data of the y-coordinates of the apexes are compared in the comparator 13, and the i-th data is discriminated from the (i−1)-th data to be larger or smaller. The result of discrimination can be pulse-inputted in the maximal and minimal detecting section B.

The maximal and minimal detecting section B comprises a flip-flop circuit 14 and two inverters 15 and 16. The outputted pulse signal from the comparator 13 indicating that the i-th y-coordinate apex-data is larger than the (i−1)-th apex-data is inputted to the preset-input terminal of the flip-flop circuit 14 through the inverter 15. The outputted pulse signal from the comparator 13 indicating that the i-th y-coordinate apex-data is smaller than the (i−1)-th apex-data is applied to the reset-input terminal of the flip-flop circuit 14 through the inverter 16. From the detecting section B, a Q-signal for minimal indication (where timing for the minimal indication is at the rising part of the Q-signal) is outputted where the i-th y-coordinate apex-data is smaller than the previous (i−1)-th y-coordinate apex-data and the following j-th y-coordinate apex-data (where $j \geq i+1$) are larger than the (j−1)-th y-coordinate apex-data, and a $\overline{Q}$-signal for maximal indication (where timing for the maximal indication is at the rising part of the $\overline{Q}$-signal) is outputted where the i-th y-coordinate apex-data is larger than the previous (i−1)-th y-coordinate apex-data and the following j-th apex-data (where $j \geq i+1$) is smaller than the (j−1)-th y-coordinate apex-data.

The number discriminating section C comprises a maximal number discriminating section 17 and a minimal number discriminating section 18 both of which are of the same configuration, and an AND gate 19 to which an outputted signal is supplied from the both number discriminating sections 17 and 18.

The minimal number discriminating section 18 includes two flip-flop circuits 20 and 21 to clock terminals of which the Q-signal from the flip-flop circuit 14 is inputted. The Q-signal from the flip-flop circuit 20 is inputted to a D-input terminal of the flip-flop circuit 21, and a $\overline{Q}$-signal from the flip-flop circuit 21 is inputted to the AND gate 19. Therefore, in a state that the circuits are reset by an initial-clear signal, the $\overline{Q}$-signal is at its low level only when the Q-signal is supplied at least twice from the flip-flop circuit 14. The configuration of the maximal number discriminating section 17 is the same as the minimal number discriminating section 18, and the explanation is omitted (a difference is that the $\overline{Q}$-signal of the flip-flop circuit 14 is supplied).

In such a manner, when both $\overline{Q}$-signals from both number discriminating sections 17 and 18 are at their high level (times of detection of the maximal and the minimal are not more than one, respectively), a high level signal indicative of an A-type polygon can be outputted from the AND gate 19.

The above apex-data can be any of the data (x, y) in two dimensions without a luminescent variation mode, (x, y, I) in two dimensions with a luminescent variation mode, (x, y, z) in three dimensions without a luminescent variation mode, and (x, y, z, I) in three dimensions with a luminescent variation mode.

In the polygon crushing circuit P, by adopting a "water filling method" or a method of dividing a polygon into triangles through matrix operation as known in the art, a B-type polygon can be crushed into A-type polygons, and a detailed explanation will be omitted.

Figure 3:
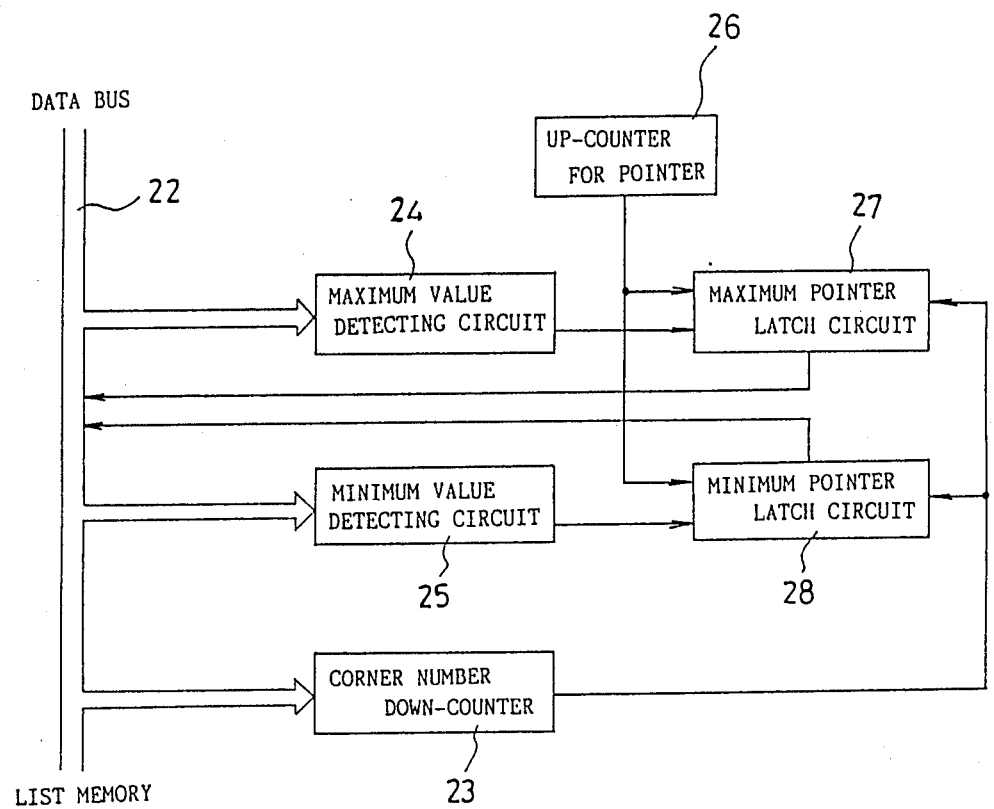
FIG. 3 is a detailed diagram of a detecting circuit for detecting apexes having a maximum value and a minimum value.

The maximum and minimum value detecting circuit 2 is, with reference to FIG. 3, is composed of a corner number down-counter 23 to count down every time the apex-data is inputted thereto while the corner number data of a polygon which are transferred through a data bus 22 are initially inputted, a maximum value detecting circuit 24 and a minimum value detecting circuit 25 respectively for detecting maximum and minimum values by inputting therein each apex-data of the polygon, an up-counter 26 for providing a pointer signal, a maximum value pointer latch circuit 27 for latching a pointer signal from the up-counter 26 based on a latch signal from the maximum value detecting circuit 24, and a minimum value pointer latch circuit 28 for latching a pointer signal from the up-counter 26 based on a latch signal from the minimum value detecting circuit 25, wherein the pointer denotes a value indicative of the order of the transferred data of the polygon.

By applying a count-zero signal from the corner number down-counter 23 to the maximum value pointer latch circuit 27 and the minimum value pointer latch circuit 28, pointers being signals latched in each of pointer latch circuits 27 and 28 can be outputted to the data bus 22.

That is to say, while writing every apex-data of the polygon in the list memory 3, pointers corresponding to the miximum and minimum values, respectively, can be obtained. At a time when writing-in of all of the apex-data of the polygon has been completed, the above pointers are written in the list memory 3. Therefore, a specific operation time is not necesary for obtaining pointers.

In the list memory 3, addresses for data are allocated in the list memory 3, as shown in FIG. 4, by a row address and a column address. The corner number data are stored at a memory-area where the row address is 0 and the column address is 0, and apex-data for the polygon (the number of corners is n) are stored in memory-areas where the row addresses are 1 to n, the maximum pointer is stored in a memory-area where the row addres is n+1 and the column address is 0 and the minimum pointer is stored in a memory-area where the row address is n+1 and the column address is 1. The memory-areas where the row addresses are 1 to n are respectively divided by column addresses of 0 to 3, wherein any of data, (x, y) in two dimensions without a luminescent variation mode, and (x, y, z, I) in two dimensions with a luminescent variation mode, (x, y, z) in three diemsnions without a luminescent variation mode, and (x, y, z, I) in three dimensions with a luminescent variation mode can be adopted.

Data of the following polygons are also stored in every memory-areas as in the same arrangement (the arrangement of corner number data, each apex-data, maximum value pointer, and minimum value pointer).

Figure 5:
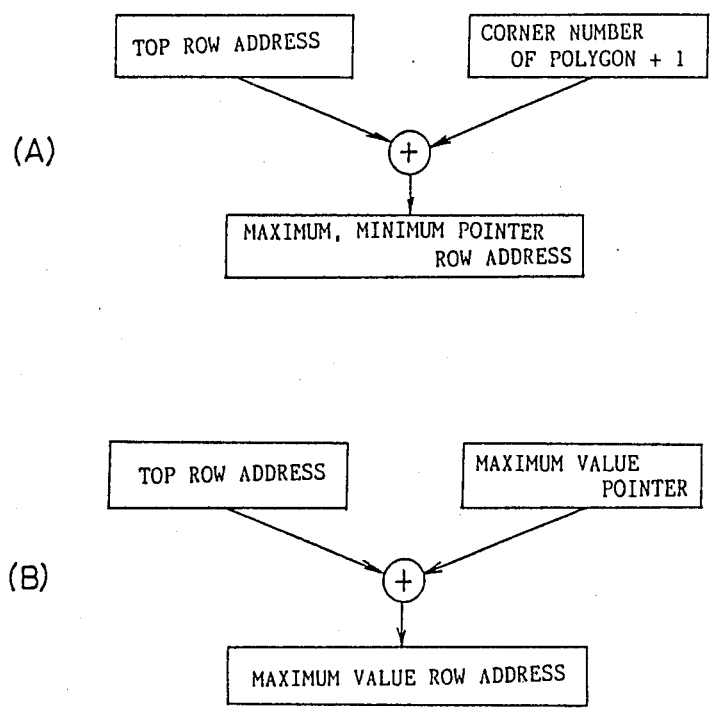
FIG. 5 is a diagram explaining an operation of a list memory controlling circuit.

In the list memory controlling circuit 4, with reference to FIG. 5, a row address containing the maximum pointer and the minimum pointer ((n+1)-th address in the case of FIG. 4) is obtained by adding the top row address to data which is obtained by adding 1 to the corner number of the polygon, and the maximum value row address is obtained by adding the top row address to the maximum value pointer stored in the above-mentioned row address. It is a matter of course that the minimum value row address is obtained by adding the top row address to the minimum value pointer.

In such a manner, row addresses of apexes corresponding to the maximum and minimum values can be easily obtained, respectively, on the basis of the maximum value pointer and the minimum value pointer. For instance, where apex-data of each apex is transferred in a counterclockwise order, apex-data from the apex corresponding to the maximum value to the apex corresponding to the minimum value can be obtained one after another in counterclockwise order, by increasing the row address one by one (Increase of the row address is performed, for example, by counting with the up-counter having an incremenal number or radix number equal to the corner number n of the given polygon so as to return to the initial state by counting n times, and adding the result to the top row address.), either, apex-data from the appex corresponding to the maximum value to the appex corresponding to the minimum value can be obtained in the reverse order, one after another in clockwise order, by decreasing the row address one by one (Decrease of the row address is performed, for example, by counting with the down-counter having an incremental number or radix number equal to the corner number n of the given polygon so as to return to the initial state by counting n times, and adding the result to the top row address).

Figure 6:
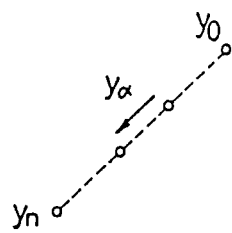
FIG. 6 is a diagram useful in understanding the operation of a left one-side completion detecting circuit.

The left one-side completion detecting circuit 5 detects, as shown in FIG. 6, a completion of interpolation of a ridge, when a y-coordinate (a coordinate in a prependicular direction to the scanning line) of the interpolated point becomes equal to the y-coordinate yn of the ending point of the ridge, wherein the interpolation for one point point is obtained by substracting the value of the y-coordinate each time the other coordinates x or z, or luminescent value I if necessary, is interpolated by one point starting from a starting point (whose y-coordinate is y0), on the basis of y-coordinate. Then, a completion detecting signal is applied to the list memory controlling circuit 4.

The above-described manner is the same in an operation of the right one-side completion detecting circuit 6.

Figure 7:
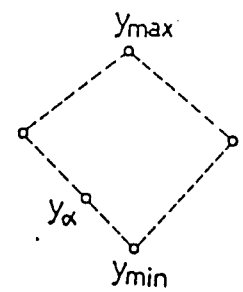
FIG. 7 is a diagram useful in understanding the operation of a one polygon completion detecting circuit.

The one polygon completion detecting circuit 7 detects, as shown in FIG. 7, a completion of a process on a polygon when the value of y-coordinates of the interpolated points become equal to the minimum value ymin, wherein the interpolation is done along both left and right sides starting from the point of maximum value ymax of y-coordinate. Then, a completion detecting signal is applied to the list memory controlling circuit 4.

Figure 8:
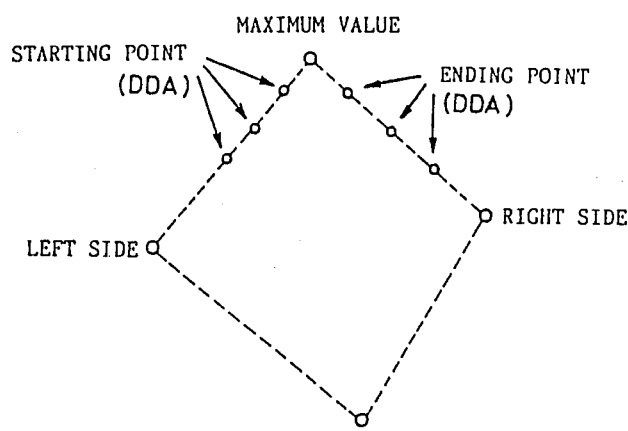
FIG. 8 is a diagram useful in understanding the operations of a left-side interpolating circuit and a right-side interpolating circuit.

The left side interpolation circuit 8 and the right side interpolation circuit 9 include an up-counter for addressing the apexes corresponding to the left side ridge and a down-counter for addressing the apexes corresponding to the right side ridge, in the case that each apex-data of the polygon is transferred in the counterclockwise order and interpolation is done successively from the maximum value of y-coordinate. In both counters, the row address of the address where the maximum value of y-coordinate is stored is loaded as an initial value, and as shown in FIG. 8, count-up and count-down are simultaneously perfomed on the basis of the row address in which the maximum value is stored, thereby ridges on both sides are simultaneously interpolated. The interpolated values on the left ridge and the interpolated values on the right ridge are applied to the DDA circuit 10 as an initial point and an ending point, respectively.

In accordance with the configuration described in the foregoing, during an interval that data (corner number data of a polygon and apex-data) processed by coordinate transformation, clipping, and the like are stored in the list memory 3, pointers of apexes corresponding to the maximum and the minimum values along the y-coordinate (perpendicular to the scanning line) are detected in the maximum and minimum value detecting cirucit 2, and are stored in an area of the list memory 3 to the rear of the above data.

Thereafter, the apex-data corresponding to the maximum value base on the above-mentioned pointer are inputted to the left side interpolation circuit 8 and the right side interpolation circuit 9 under control of the list memory controlling circuit 4, and apex-data following the above apex-data and apex-data proceeding to the above apex-data (in the order of transferring) are inputed to the left side interpolation circuit 8 and right side interpolation circuit 9, respectively. Thereby, each ridge is interpolated based on the maximum value of a y-coordinate. The obtained interpolated values are applied to the DDA circuit 10.

In the above case, when it is discriminated that interpolation of each ridge is completed, next apex-data are supplied to a corresponding interpolating ciruit under control of the list memory controlling circuit 4, based on the completion detecting signal from the left one-side completion circuit 5 or the right one-side completion circuit 6.

When the interpolations for whole ridges are finished as in the manner mentioned above, data of the next polygon is read under control of the list memory controlling circuit 4 based on the completion detecting signal, and the same process is repeated as described in the foregoing, so that necessary pointing processes can be completed for all polygons.

Referring now to FIGS. 9-1 to 9-3 which illustrate a more concretized embodiment of the polygon-filling apparatus, including a maximum value detecting circuit 24 a minimum value detecting circuit 25, a mode word analyzing section 29 to all of which data are transferred through a data bus 22, and list memories 32 to 35. The mode word analyzing section 29 analyzes a mode word (indicative of any mode of two dimensions without a luminescent variation, two dimensions with a luminescent variation, three dimensions without a luminescent variation, and three dimensions with a luminescent variation, indicative of corner numbers of a polygon, and the like) which is the first word in the data transferred through the data bus 22. The list memories 32 to 35 are memories for values of the x-coordinate, y-coordinate, z-coordinate and index, respectively, each of which is composed of two RAMs which are changed over by a control signal from a RAM changeover control section 37. The RAM changeover control section 37 is controlled by a signal indicating that a content of a polygon number counter 36 for counting the number of polygons by a signal inputted therein from the mode word analyzing section 29 reaches a limit corresponding to a capacity of one sheet of the RAM. The RAMs are changed each time the number of polygons reaches a predetermined number. In detail, if the data of the other RAM is processed after the data of the polygons in the predetermined number have been stored, the RAMs are changed when the above process is complete.

Further, the apparatus of the embodiment includes a maximum value pointer latch circuit 27 and a minimum value pointer latch circuit 28 for receiving a content of an up-counter 26 for a pointer or row address initialized by the mode word analyzing section 29 in correspondence with the maximum value detecting circuit 24 and the minimum value detecting circuit 25.

The mode information from the mode word analyzing section 29 is supplied to a classified controlling section 30, where an address increment signal is generated to be supplied to an up-counter 31 as an input-side address generating section, and a pulse signal is generated at every element to be supplied to an up-counter 26 for the pointer.

The data transferred through the data bus 22, the pointer data outputted from the maximum value pointer latch circuit 27 and the minimum value pointer latch circuit 28, and the input-side address data outputted from the up-counter 31 are supplied to the list memories 32 to 35.

Data read from the list memory 32 for the x-coordinate, and data read from the list memory 33 for y-coordinate are supplied to a DDA-side address generating section 45 to generate address data which are supplied to the list memories 32 to 35. The above-mentioned data include, as shown in FIG. 4, not only the x-coordinate value but also the corner number of the polygon and the maximum pointer in the 0-th column address, and not only the y-coordinate value but also the minimum pointer in the first column address. These data are inputted in the DDA-side address generating section in order to calculate a row address. Data read from the list memory 33 for the y-coordinate and count data from the polygon number counter 36 are supplied to an execution completion detecting section 46 to generate an execution completion detecting signal which is supplied to a mode word latch section 47. The data read from the list memories 32 to 35 are supplied to a subtracter section 38 for left-side interpolation and a subtracter section 41 for right-side interpolation, respectiely. Difference data outputted from each of subtracter sections 38 and 41 are supplied to divider sections 39 and 42, respectively. Quotient data outputted from the divider sections 39 and 42 are supplied to accumlators 40 and 43, respectively, wherein left-side interpolating data and right-side interpolating data are generated. The interpolating calculation on each side is performed for every scanning line in a synchronized state with each depending on a synchronizing signal outputted from an interpolation calculation synchronizing section 44.

In addition, the above mode word is latched in a mode word latch section 48 and pixel size data are generated.

Therefore, in this embodiment of the polygon-filling apparatus, points where a ridge line lying from an apex corresponding to the maximum value to an apex corresponding to the minimum value intersects the scanning line can be regarded as starting points, and points where a ridge line lying from an apex corresponding to the minimum value to an apex corresponding to the maximum value intersects the scanning line can be regarded as ending points (in the case that the order of transfer is counterclockwise).

Indication by filling can be carried out based on the above-regarded result, thus a working memory in which plane data is written for filling is not necessary, and the frequency of reading from a memory and the frequency of writing into a memory is greatly reduced, thus the time necessary for displaying a filled polygon on a scanning display after data are supplied can be greatly reduced.

For example, a conventional filling rate was about 800 polygons per second, while in the above embodiment, a rate of 40,000 polygons per second was attained, wherein one polygon means a square inclined in an arbitrary direction containing 20×20 dots.

Figure 12:
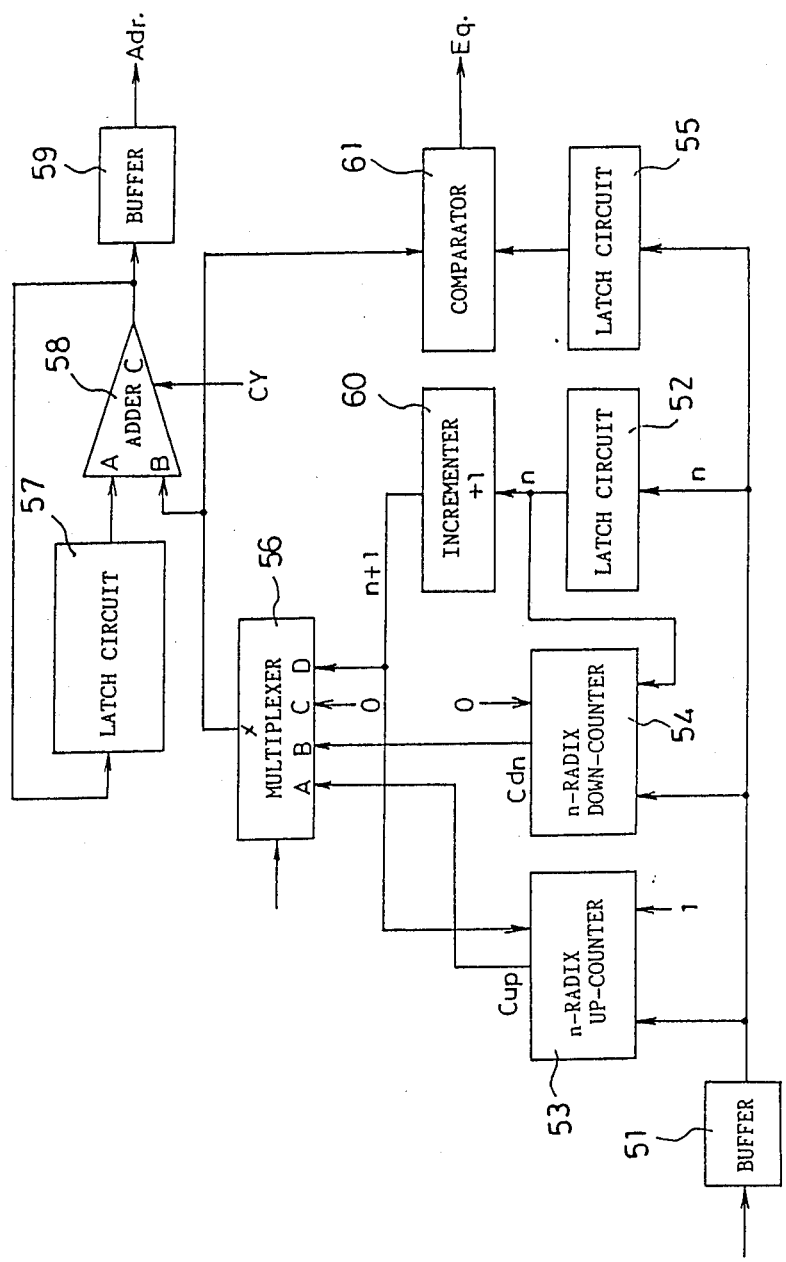
FIG. 12 is a block diagram illustrating an apex tracking apparatus for a polygon.

FIG. 12 illustrates a block diagram of an apex tracking apparatus for a polygon.

Apex-tracking of a polygon for obtaining apex-data to be supplied to a linear interpolation device in a polygon-filling apparatus of the prior art must be performed by microprogramming in the following manner: Necessary data are read from a memory, results of a calculation are stored in a memory, and particularly interim results of calculation are also read from the memory and stored in the memory. The process requires a long time for apex-tracking Further, the process has a problem wherein step numbers are increased for microprogramming, and width of the bit field is enlarged.

In the apex tracking apparatus for a polygon according to the invention shown in FIG. 12, a reduction the number of steps in microprogramming, and a reduction the bit width field can be realized; the configuration thereof is described as follows:

Among graphic data for a polygon, data indicative of corner number n is inputted in a first latch circuit 52 through a buffer 51, a pointer Pmax. indicative of a stored position of apex-data corresponding to the maximum value along a direction perpendicular to the scanning line is inputted in a n-radix up-counter 53 and a n-radix down-counter 54 through the buffer 51, and a pointer Pmin. indicative of a stored position of apex-data corresponding to the minimum value along a direction perpendicular to the scanning line is inputted to a second latch circuit 55. The counted number Cup counted by the up-counter 53 and the counted number Cdn counted by the down-counter 54 are inputted in a multiplexer 56. The outputted data from the multiplexer 56 is, together with a base pointer Bp (pointer data indicative of the top stored position in the area in which a series of graphic data of every polygon are stored) of a third latch circuit 57, inputtted in an adder 58. The added result in the adder 58 is outputted through a buffer 59 as a pointer Adr indicative of a stored position of each data.

The corner number data n out of the first latch circuit 52 is inputted as it is, in the down-counter 54, thereby used as a preset data in case of overflow of the counted figure. The corner number n is also inputted in an incrementer 60 to generate data of n+1. Such data of n+1 is, as it is, inputted in the up-counter 53 to be used for detecting an overflow of the counted figure and also inputted in the multiplxer 56.

In the above multiplexer 56, a 0-signal is further inputted. The output data from the multiplexer 56 is inputted in a comparator 61 together with the pointer data Pmin. which is provided by the second latch circuit 55, and a signal Eq indicative of completion of tracking is outputted from the comparator 61.

The added result from the adder 58 is fed back to the third latch circuit 57 according to predetermined timing, thereby a base pointer Bp for graphic data of the following polygon is renewed.

In the above embodiment, graphic data having been processed with coordinate transformation, clipping and the like, include data of corner number, data indicative of coordinates of apexes in the order of transfer and data indicative of luminescent values for a polygon shown in FIG. 10, and pointers indicative of stored positions of apex-data corresponding to the maximum and the minimum values along a perpendicular direction to the scanning line. Such data occupies the list memory wherein the data are stored in the above order for every polygon (see FIG. 4).

An operation of the apex tracking apparatus will be explained hereinafter.

First, the third latch circuit 57 is cleared to zero, and a base pointer Bp is set to 0. This operation is repeated each time the list memory is changed and data for a new polygon is handled.

After performing the above-mentioned initial set-up operation, the multiplexer 56 is controlled so that an input C i.e. 0 is selected for an output, and a carry input of the adder 58 is set to 0 so as to output the base pointer Bp as a pointer Adr (top row address) indicative of a stored position of data. By reading data in the 0th column stored at a position corresponding to the pointer Adr, data of corner numbers n can be obtained.

This data of corner numbers n is inputted in the first latch circuit 52 through the buffer 51. The output is supplied to the down-counter 54 as it is, and is used for preset data when the counted figure is overflowed. The data of corner numbers n being inputted in the first latch circuit 52 is supplied to the incrementer 60 to generate a data of n+1 which is inputted as it is, to the up-counter 53 and used therein for detecting overflow of counted figure.

The above data of n+1 is also inputted in the multiplexer 56 as an input D. Thus, the multiplexer 56 is controlled in a state having an input D i.e. n+1, for an output, and the carry input of the adder 58 is put to 0 so as to output data where n+1 is added to the base pointer Bp, as a pointer Adr indicative of a stored position of data.

By reading data stored at a position corresponding to the pointer Adr, there can be obtained the maximum pointer Pmax. indicative of the stored position of the apex-data corresponding to the maximum value along a perpendicular direction to the scanning line, and the pointer Pmin. indicative of the stored position of the apex-data corresponding to the minimum value along the same direction. The above pointer Pmax. is, as an initial value, inputted in the up-counter 53 and the down-counter 54 through the buffer 51, and the above pointer Pmin. is inputted in the second latch circuit 55 through the buffer 51.

In such a manner, necessary data for tracking apex-data of the polygon are obtained.

Thereafter, apex-data can be tracked in the following manner:

By independently counting the up-counter 53 and the down-counter 54, the up-counter 53 outputs, as count data Cup, pointer data idicative of the stored positions of apex-data increased by one after one from the pointer indicative of the stored position of the maximum apex-data, and on the other hand the down-counter 54 outputs, as count data Cdn, pointer data indicative of stored positions of apex-data decreased by one after one from the same pointer Pmax. After the above count data Cup and Cdn reach the maximum and the minimum values thereof, respectively, the maximum and the minimum values are outputted as they are, i.e. the counter is preset by an overflow or an underflow, so that pointer data indicative of the stored position of apex-data can be outputted as count data Cup and Cdn without inconvenience. Therefore, by outputting the pointer Adr indicative of the apex-data storing position through the adder 58 and the buffer 59, and reading the apex-data from the position corresponding to the above pointer Adr or the row address, two neighboring apex-points can be linear-interpolated through a linear interpolator.

During the above tracking operation, the count data outputted from the multiplexer 56, and the pointer Pmin. indicative of the stored position of apex-data corresponding to the minimum value along a perpendicular direction to the scanning line are usually compared in the comparator 61. When the two compared data are the same, a signal Eq indicative of completion of the tracking operation is outputted from the comparator 61, and then, the multiplexer 56 is controlled in a state that the input D i.e. $n+1$ is selected to output, and the added result where $n+2$ is added to the base pointer Bp stored in the third latch circuit 57 can be outputted, by instituting the carry input of the adder 58 as 1. Such added result can be fed back to the third latch circuit 57, so that a base pointer indicative of the graphic data storing area of the next polygon is stored in the third latch circuit 57.

Thereafter, the above operation is repeated to track apex-data of the next polygon.

In the above embodiment, apex-data stored at the position corresponding to the pointer Adr indicative of the stored position of each apex-data can be any of data (x, y) in two-dimensions without a luminescent variation mode, data (x, y, I) in two-dimensions with a luminescent variation mode, data (x, y, z) in three-dimensions without a luminescent variation mode, and data (x, y, z, I) in three-dimensions with a luminecent varation mode.

Figure 13:
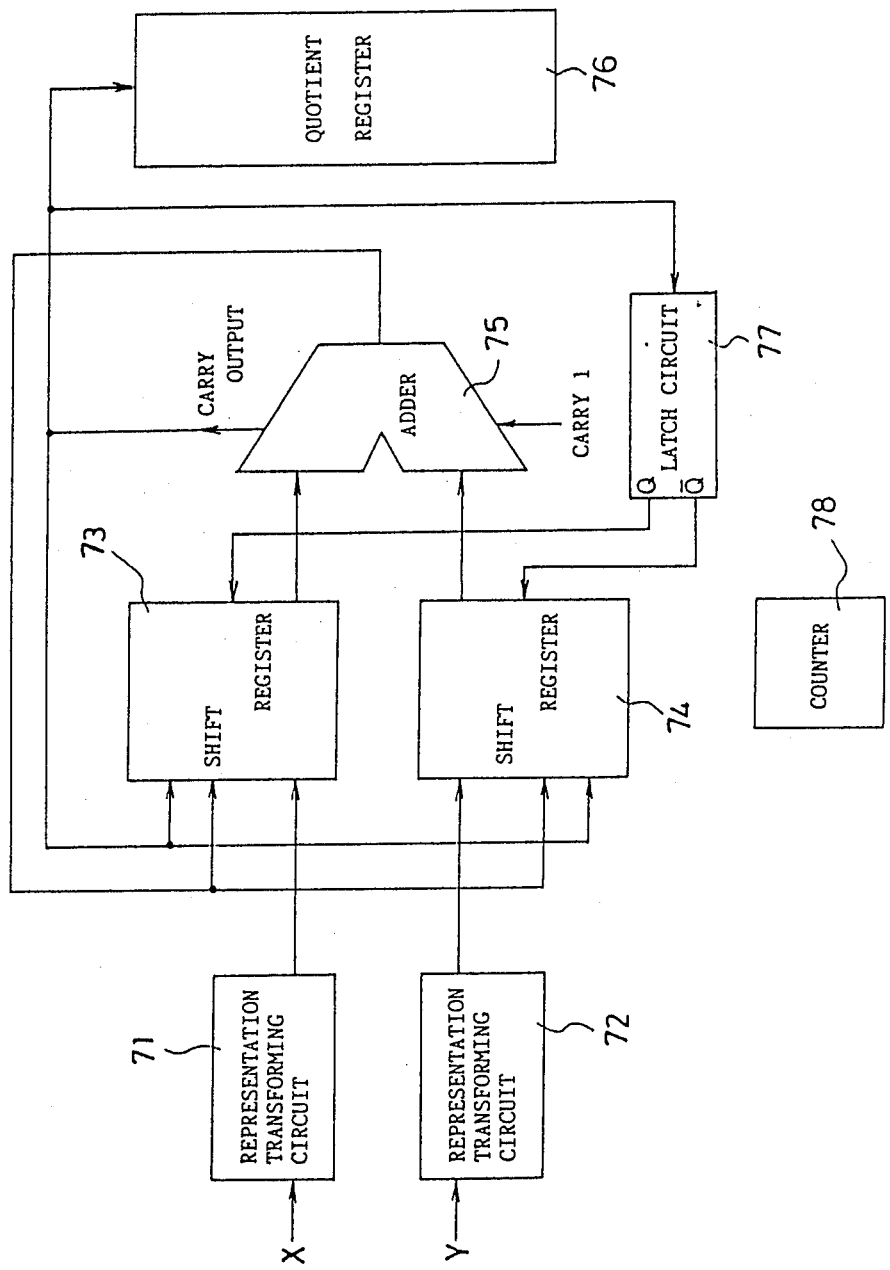
FIG. 13 is a block diagram of a divider for a linear interpolater.

FIG. 13 depicts a block diagram of an electric configuration of a divider for a linear interpolater which is, for example, adapted to the divider section of the above DDA circuit 10.

In the above divider for linear interpolation, data X is transformed into floating-point representation in a representation transforming circuit 71 and is inputted in a shift register 73, while other data Y is transformed into floating-point representation in a representation transforming circuit 72 and is inputted to another shift resister 74. The shift registers 73 and 74 are of a construction so that an output signal can be outputted as it is or can be reversed. The output data from the shift registers 73 and 74 are inputted in an adder 75 in which a carry input normally of 1 is supplied so that the adder 75 operates as a subtracter (further, capable of comparing as to which is large or small between mantissas and between exponents, respectively, of data in floating-point representation). The subtracted result from the adder 75 can be fed back to the shift registers 73 and 74. Further, carry output from the adder 75 is inputted in a quotient register 76 as quotient data, and is applied to both shift registers 73 and 74 as a shift load control signal, and further is inputted in a latch circuit 77 which operates as a discriminating circuit. The control signals different from each other (Q output, and $\overline{Q}$ output) from the latch circuit 77 are alternatively inputted in the shift register 73 or 74. In addition, a counter 78 for varying and controlling trial times of subtraction is shown.

In accordance with the divider for linear interpolation of the above configuration, an appropriate linear interpolation can, for example, be accomplished in the following manner, on conditions that a difference between the two points along the X-coordinate axis is inputted in the representation transforming circuit 71 as data X, and a difference between the two points along the Y-coordinate axis is inputted in the representation transforming cirucit 72 as data Y, as illustrated in FIG. 14.

At first, data X is transformed to data X' in floating-point representation by the representation transforming circuit 71 to be stored in the shift register 73, and data Y is transformed to data Y' in floating-point representation by the representation transforming circuit 72 to be stored in the shift register 74.

The above data X' and Y' are inputted in the adder 75, and their mantissas are compared to determine which is larger. or smaller and their exponents are also compared. A carry output indicating the compared results is inputted in the latch circuit 77. From the latch circuit 77, a Q-output signal and a $\overline{Q}$-output signal both of which are different from each other are inputted in the shift registers 73 and 74, respectively, through controlling terminals thereof. One of the shift registers 73 and 74 operates as a shift register and the other operates as a register only to latch the data, that is, one which operates as a shift register becomes a dividend register and the other becomes a divisor register Consequently, by inputting contents of the shift registers 73 and 74 into the adder 75, subtraction is tried, and depending whether there is a carry output from the adder 75 or not, a shift of the content in the one which operates as a shift register, or a load of subtracted result to the one which operates as a shift register is selectively performed. The carry output is also stored in the quotient register 76 as a quotient. Thereafter, the divided result can be obtained by trial of subtraction for times determined by the content stored in the counter 78.

In greater detail, when a linear interpolation is done as in FIG. 14-A, relationships $X=X1-X0$, $Y=Y1-Y0$, and $X>Y$ are provided, so that the shift register 74 operates as a shift register and the shift register 73 operates as a register only for latching data, thus, a divided result Y/X can be obtained in the quotient register 76.

When linear interpolation is done as in FIG. 14-B, relations $X=X2-X0$, $Y=Y2-Y0$, and $X<Y$ are provided, so that the shift register 74 operates as a register only for latching data, and the shift register 73 operates as a shift register, thus, a divided result X/Y can be obtained in the quotient register 76.

In the above embodiment, the time necessary for transferring data can be shortened as compared with the case in the prior art, because loading of data to the shift resigers 73 and 74 can be performed only once.

Further, in the embodiment, discrimination of size between mantissas and between exponents must be performed at the same time, so the configuration of the adder 75 becomes slightly complicated. However, the length of exponents is no more than 8 bits, so that the degree of complication is not so great, and a selector of a complicated configuration which has been necessary in the prior art can be omitted, so as to simplify the configuration of a divider for linear interpolation.

In the above embodiment, explanation has been given where data transformed in floating-point representation are stored in the shift registers 73 and 74 from the initial stage. However, a selection can be provided in each representation transforming circuit 71 or 72, and an operation to store the data X and Y as they are, in the shift registers 73 and 74, or an operation to store the data X' and Y' transformed in floating-point representation in the shift registers 73 and 74 can be alternatively selected.

In the above case, each representation transforming circuits 71 or 72 contains a selector, so the configuration of the circuits may be complicated. However, the above built-in selector only selects as to output the data X and Y as they are or output the transformed data X' and Y', so that the selector can be greatly simplified as compared with the conventional selector. In addition, in relation to the above embodiment, size of exponents need not be compared in the adder 75, so that the simplification can be attained in such configuration that corresponds to this part.

However, in the present case, the data X' and Y' must be loaded in the shift registers 73 and 74 after discriminating the size by loading the data X are Y in the shift register 73 and 74, so the time for transferring data becomes slightly longer than in the above embodiment, but this is not particularly inconvenient.

Figure 15:
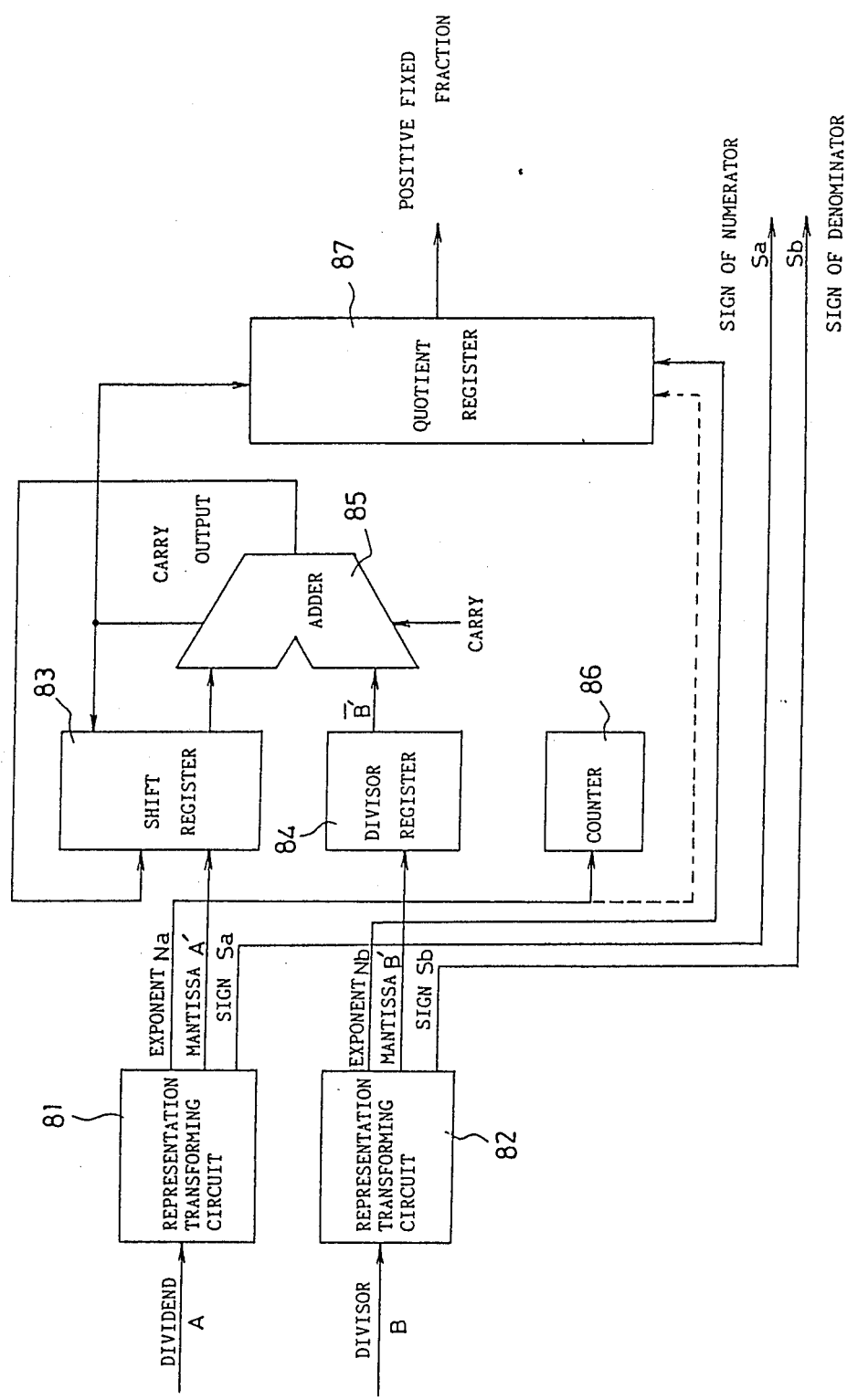
FIG. 15 is a block diagram of another embodiment of a divider for a linear interpolater.

FIG. 15 depicts an electric configuration of another embodiment of a divider for linear interpolation, which attains higher dividing speed.

In this embodiment, dividend data is inputted in a representation transforming circuit 81, and divisor data is inputted in a representation transforming circuit 82. The representation transforming circuits 81 and 83 transform the dividend data A and the divisor data B respectively into data of signs Sa and Sb, mantissas A' and B', and exponents Na and Nb. The mantissa A' is inputted in a shift register 83 from the representation transforming circuit 81, and the mantissa B' is inputted in a shift register 84 from the representation transforming circuit 82, and output data from both shift registers 83 and 84 are inputted in an adder 85. The reason that the adder 85 is used is that addition and subtraction are substanitally the same in a binary calculation; i.e., the adder 85 operates as a subtracter by usually supplying thereto a carry input of 1, and another input is supplied with a complement of 1 (negative logic). Further, the exponent data Na from the representation transforming circuit 81 is inputted in a counter 86 for controlling trial times of subtraction, and the exponent data Nb from the representation transforming circuit 82 is inputted in a quotient register 87. The output data from the above adder 85 is fed back to the shift register 83, and the carry output from the adder 85 is inputted in the shift register 83 and the quotient register 87.

In the divider for linear interpolation of the above configuration, the dividend data A is separated into sign data Sa and magnitude data, by the representation transforming circuit 81. The magnitude data is normalized so that an integral part becomes 1, and exponent data Na is generated. Also, the above divisor data B is separated by the representation transforming circuit 82, and sign data Sb, normalized mantissa data B' and exponent data Nb are generated. The exponent data Na of the above dividend data A is inputted in the counter 86, so that trial times of subtraction in the adder 85 is controlled to be Na+2 times. Under a control of the counter 86, the mantissa data A' and B' from the both representation transforming circuits 81 and 82 are inputted in the adder 85 through the shift register 83 and the divisor register 84, respectively. In the adder 85, subtraction is performed and it is controlled according to whether data of the subtracted result in the adder is supplied to the shift register as it is, or content of the shift register 83 is shifted, in response to the carry output data from the adder 85, i.e., the output data is 1 or 0. On the other hand the carry output data is applied to the quotient register 87 as a quotient. By performing subtraction in the adder 85 for Na+2 times which is determined by the content in the counter 86, a quotient can be obtained whose number of figures are Na+2 from the $2^{(Na-Nb)}$-th figure to the $2^{-(Nb+1)}$-th figure. In the above configuration, the calculated result is obtained only for the magnitude-part and the sign is unknown, but the sign can be decided by inputting signs Sa and Sb to a sign discriminating circuit (not illustrated) from the representation-transforming circuits 81 and 82.

Since the above-obtained quotients are added for the number of times corresponding from $2^{Nb}$ to $2^{(Nb+1)}-1$ in response to the exponent data Nb of the data B inputted as the divisor data, accurate coordinates of the dividing points can be obtained without error in integral parts by adding the quotients for the above number of times from the $2^{(Na-Nb)}$-th figure to the $2^{-(Nb+1)}$-th figure. To explain in detail, when a quotient is represented in fixed-point representation, an error occurs beyond the $2^{-(Nb+2)}$-th figure by discontinuing calculation for a quotient at the $2^{-(Nb+1)}$-th figure. Such discontinuation error e satisfies the relationship:

$$e < 2^{-(Nb+1)}$$

and the cumulative error E by adding $2^{(Nb+1)}-1$ times is, $$E = \sum_{i=1}^{2^{(Nb+1)}-1} e < \sum_{i=1}^{2^{(Nb+1)}} e$$

$$< \sum_{i=1}^{2^{(Nb+1)}} 2^{-(Nb+1)} = 2^0 = 1,$$

so that E<1. It is seen that the cumulative error of the integral part is less than 1.

Therefore, quotients should be gained to the $2^{-(Nb+1)}$-th figure so as not to generate an error in the integral part by addition for B-times.

Figure 16:
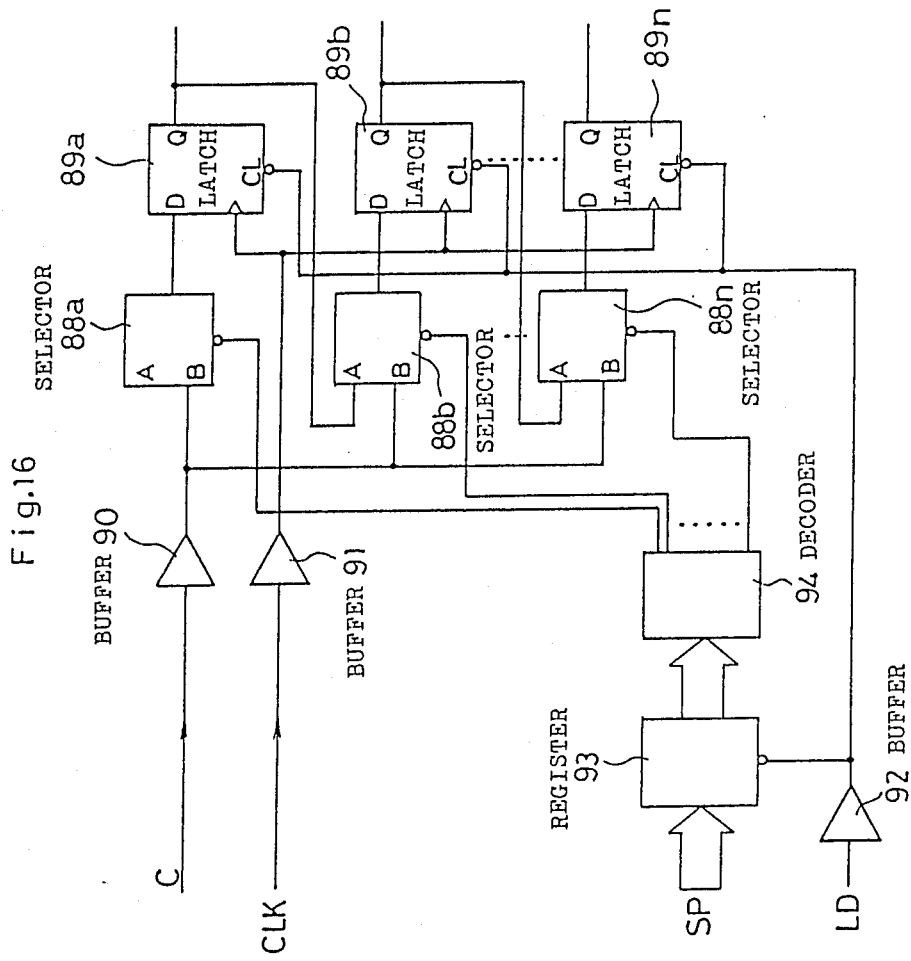
FIG. 16 is an electric circuit diagram of a quotient register.

FIG. 16 depicts an electric configuration of the quotient register 87, which includes selectors 88a, 88b, ---, 88n and latch circuits 89a, 89b, ---, 89n. The carry output data C from the above adder 85 shown in FIG. 15 is inputted to an input terminal of each selectors 88a, 88b, ---, 88n through a buffer 90. And an output data from the lower-figure latch circuit is supplied to the other input terminal of each selector. A clock signal CLK is inputted to an clock-signal input terminal of each latch circuit 89a, 89b, ---, 89n through a buffer 91, and a load signal LD is inputted to a clear terminal of each latch circuit 89a, 89b, ---, 89n through a buffer 92. Further, the quotient register 87 includes a register 93 to which a store pointer SP determined by the exponent data Na and Nb shown in FIG. 15 is inputted by the above load signal, and a decoder 94 to which the store pointer SP stored in the register 93 is inputted. The decoded signal is inputted to a select-input terminal of each of the above selectors 88a, 88b, ---, 88n, thereby only a suitable selector supplies the carry output data C to the corresponding latch circuit.

So, a predetermined selector supplies carry output data successively to the corresponding latch circuit in response to the decode signal from the decoder 94. Even when the quotient gained as data from the $2^{(Na-Nb)}$-th figure to the $2^{-(Nb+1)}$-th figure is in floating-point representation owing to the adder 85 in FIG.

15, the quotient data can be automatically transformed into fixed-point representation by using the quotient register in FIG. 16. The time required for storing all of the necessary quotient data in the quotient register can be reduced, because the trial times of subtraction has been decreased and the storing can only be performed for the necessary figures.

While the quotient register of the above configuration is so arranged that the starting figure is the $2^{-(Nb+1)}$-th figure and the stored data is shifted-up at every storing of the carry output data, an arrangement can be adopted wherein the carry output data is stored from the $2^{(Na-Nb)}$-th figure down to the lower figures.

Figure 17:
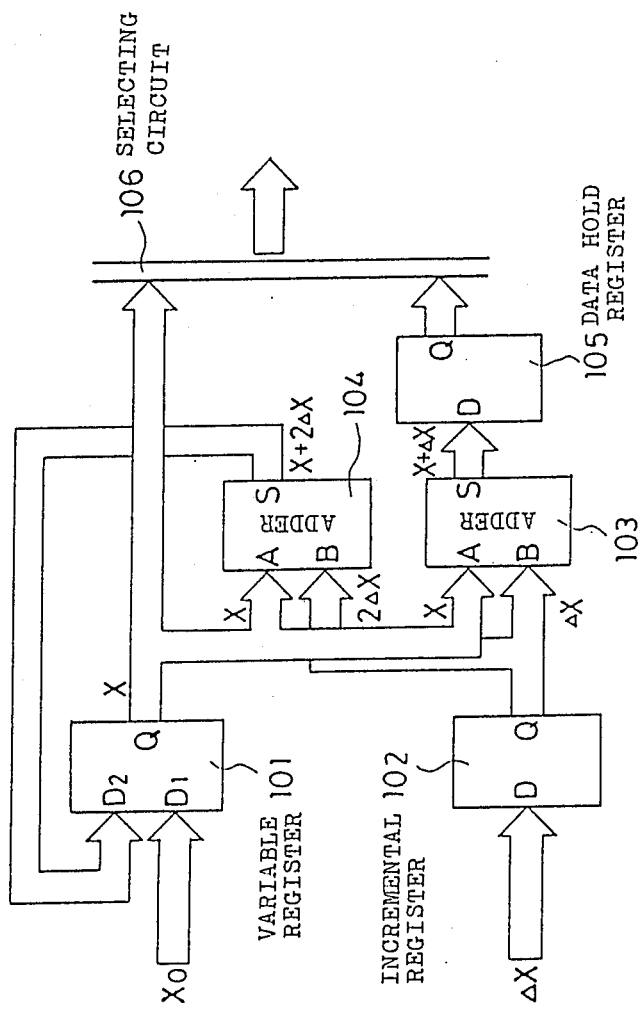
FIG. 17 is a block diagram of an accumulator for a linear interpolater.

FIG. 17 depicts a block diagram of an electric configuration of the accumulater for linear interpolation, which includes a variable register 101 to which predetermined base data $X_0$ is initially inputted, an incremental register 102 to which predetermined incremental data $\Delta X$ is inputted, a first adder 103 to which the output data of the variable register 101 and the incremental register 102 are inputted as they are, a second adder 104 to which the output data from the incremental register 102 is inputted in a 1-bit shifted-up form, a data hold register 105 to hold the output data from the first adder 103, and a selecting circuit 106 alternatively to output the outputted data from the variable register 101 or the hold data from the data hold register 105. The output data from the second adder 104 is fed back to the variable register 101.

Figure 18:
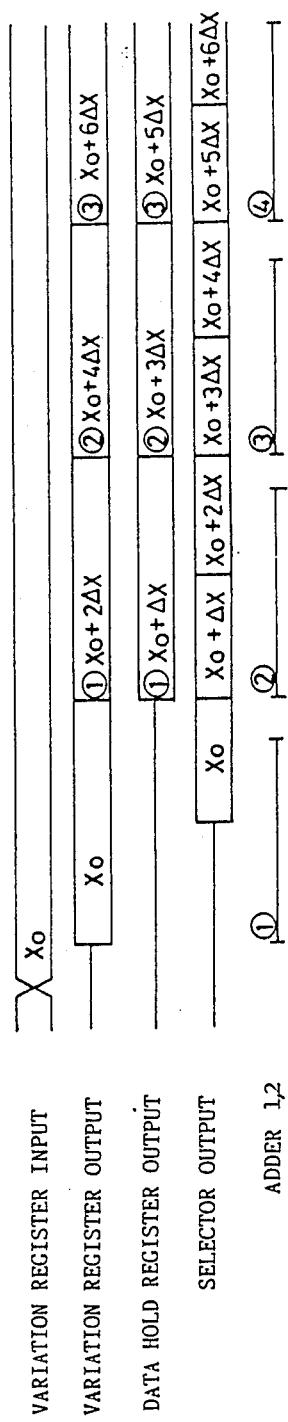
FIG. 18 is a diagram useful in understanding the operation of the accumulator.

In the accumulator of the above configuration, a first added result $X_0+\Delta X$ is obtained by adding predetermined base data X to the incremental data $\Delta X$ in the first adder 103, and then the second added result $(X_0+2\Delta X)$ is obtained by adding a predetermined base data $X_0$ to the 1-bit shifted-up incremental data $2\Delta X$ in the second adder 104. In further detail, in the adding process in both of the adders 103 and 104, the incremental data and the 1-bit shifted-up incremental data are almost simultaneously inputted, so that the added results can be obtained almost at the same time, and both of the added results $X_0+\Delta X$ and $X_0+2\Delta X$ can be obtained in a time required for performing one adding operation, as shown in FIG. 18, while in the prior art data have been obtained by twice peforming the adding operation.

The added result $X_0+\Delta X$ is held in the data hold register 105 for a predetermined time (a time for outputting to the outside through the selecting circuit 106). The added result $X_0+2\Delta X$ is fed back to the variable register 101, which outputs the added result $X_0+2\Delta X$, thus both added results $X_0+\Delta X$ and $X_0+2\Delta X$ can be outputted to the outside through the selecting circuit 106 in the same order.

Thereafter, the content of the variable register 101 is $X_0+2\Delta X$, and by repeating the same operation mentioned above, the third added result $X_0+3\Delta X$ and the fourth added result $X_0+4\Delta X$ can be outputted to the outside.

The same process is repeated to sequentially output to the outside the odd result $X_0+(2n-1)\Delta X$ and the even result $X_0+2n\Delta X$ in this order.

When the accumulater of the above configuration is utilized in a linear interpolater of a graphic display unit, both data of a predetermined base data $X_0$ and an incremental data $\Delta X$ can be gained from values of coordinates of the two apexes, and coordinates of points between the two apexes can be sequentially calculated according to both data. The speed of calculation can be, as described above, made higher, thus the drawing speed can also be made higher as the whole. The construction becomes complex as compared with the accumulator of the prior art, however, the circuit can be designed in LSI to have the advantage of speeding-up the calculation.

The above variable register 101 and the incremental register 102 are inputted with data containing not only an integral part but also a fractional part. In the fixed-point representation, the data consists of an integral part of a-bits, and a fractional part of b-bits, and the first adder 103 and the second adder 104 are usually required to have an integral section and a fractional section. On the first adder 103, however, only the added result $X_0+(2n-1)\Delta X$ is outputted, thus one can use the adder capable of outputting the added result only in the integral part as far as the accumulator is utilized in a graphic displaying unit. In such a manner, complexity of configuration can be reduced to a minimum in comparison with the prior-art accumulater. This is because the calculation is performed by obtaining a carry in the fractional part, and then adding the carry to the integral part. Thus, the fractional part need not to be outputted.

Figure 19:
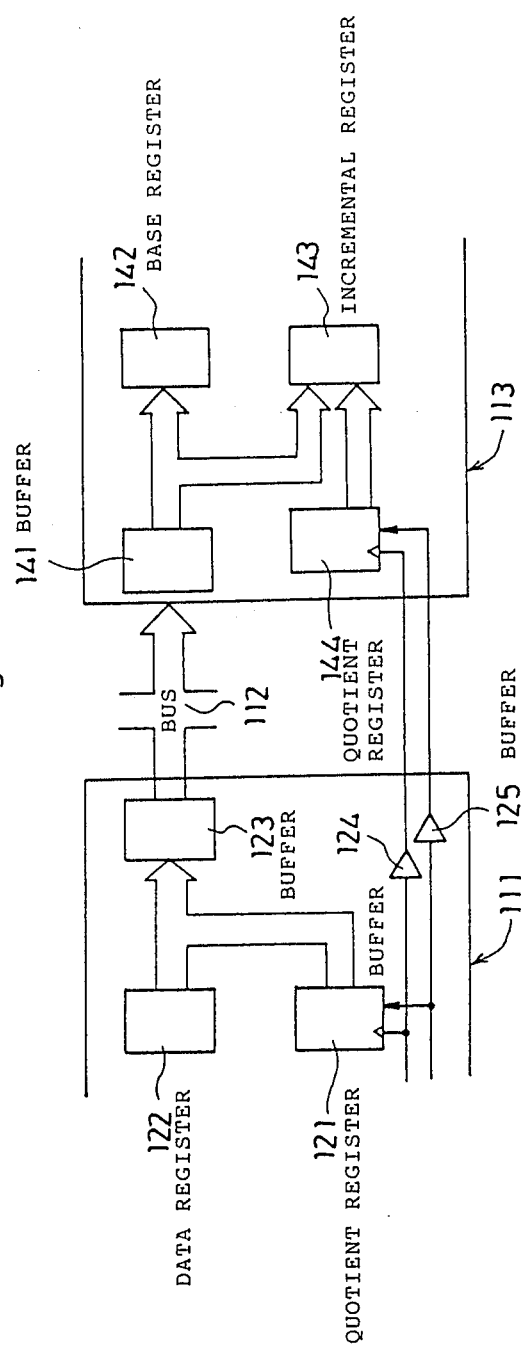
FIG. 19 is a schematic block diagram of a transferring apparatus to transfer incremental data obtained in the divider to the accumulator.

FIG. 19 depicts a schematic block diagram of an elecric configuration of an apparatus transferring the incremental data or, in another word, divided result obtained by the divider to the accumulater in the linear interpolater, wherein there are provided an IC 111 on the divider-side, a parallel data bus 112, and an IC 113 on the adder-side.

In detail, the IC 111 on the divider-side comprises a quotient register 121 in which a divided result gained in a divider (not illustrated) or the like is stored by every bits, and a data register 122 in which data except the divided result (e.g. a coordinate data of the base point) is stored. The data stored in the both registers 121 and 122 are alternatively outputted into the parallel data bus 112 through a buffer 123. A clock signal and the divided result transferred one bit after one are inputted in the quotient register 121.

In addition, a buffer 124 is inserted in the above clock signal line, and a buffer 125 is inserted in the above data line for one bit after one.

The IC 113 on the adder-side alternatively supplies the data which has been inputted therein through the parallel data bus 112, to a base register 142 or an incremental register 143 through a buffer 141. The IC 113 further includes a quotient register 144 to which data are inputted one bit after one in synchronization with the quotient register 121. The divided result stored in the quotient register 144 is transferred to the incremental register 143 by means of internal transfer In the linear interpolater of the above configuration, trials of subtraction are performed for the number of predetermined times in a substracter (not illustrated) for calculating an incremental value, based upon coordinate values of the two points inputted from a inputting means (not illustrated) and the number of intermediate points to be interpolated between the two points. The divided results are stored in the quotient register 121 of the IC 111 on the divider-side one bit after one, and stored at nearly the same instance in the quotient register 144 of the IC 113 on the adder-side one bit after one. So, the whole divided results are stored in the quotient register 121 of the IC 111 on the divider-side, and at nearly the same instance the whole divided results are stored in the quotient register 144 of the IC 113 on the adder-side.

Thereafter, the whole divided results are temporarily transferred as incremental data from the quotient register 144 of IC 113 on the adder-side by means of internal transfer, and cumulatively added to the base data stored in the base register 142 through the buffer 141, thereby accomplishing linear interpolation between the two points.

In conclusion, a transfer of the base data is done through a parallel data bus as in the conventional case, thus there is no disadvantage, and in the above embodiment, the divided results having been serially transferred to the quotient register 144 of the IC 113 on the adder-side is stored in the incremental register 143, while the base data are parallel-transferred, therefore the required time can be shortened in the whole.

With regard to transfer of the divided results, data which have been gained one bit after one can be sequencially stored in the quotient register 144 of the IC 113 on the adder-side while the dividing operation is executed, thus the time particularly required for transferring the divided result is greatly shortened, and other data can be transferred during the transferring operation of the above data because the parallel data bus is not exclusively occupied. Reducing the transferring time of the divided result is obvious where the number of bits capable of being transferred simultaneously on the parallel data bus 112 is reduced by decreasing the number of pins of both IC's 111 and 113.

In the above embodiment, since the IC 111 on the divider-side includes the quotient register 121, the linear interpolation between the two points can be done without inconvenience even when an IC on the adder-side does not include the quotient register 144. However, in the present case, the time-shortening as in the above case cannot be attained.

In addition, where the number of figures in the dividing execution is previously known, subtraction trial times for division can be reduced, so that the required time for executing division can be shortened.

Further, where the required number of figures is less than the figures which the quotient register 144 can store, the time necessary for storing data in the quotient register 144 can be shortened as in the following:

For the quotient register 144, an electric configuration shown in FIG. 16 can be adopted, which includes selectors 88a, 88b, ---, 88n and latch cirucits 89a, 89b, ---, 89n each corresponding to data of each figure. An output data C from a divider (not illustrated) is inputted to an input terminal of each of selectors 88a, 88b, ---, 88n through a buffer 90, and an output data from the latch circuit of the upper figure is inputted to another input terminal of the selector. A clock signal CLK is inputted to a clock input terminal of each latch circuit 89a, 89b, ---, 89n through a buffer 91, and a load signal LD is inputted to a clear terminal of each latch circuit 89a, 89b, ---, 89n through a buffer 92. The quotient register 144 further includes a register 93 in which a store pointer SP determined by a divisor, a dividend, and the like is inputted in response to the load signal LD, and a decoder 94 in which the store pointer SP registered in the register 93 is inputted, thereby only one specific selector inputs the output data C in the corresponding latch circuit by supplying the decoded signal to the select input terminal of each selector 88a, 88b, ---, 88n.

In the above configuration, the necessary time for storing the divided results can be shortened in comparison with the quotient register of the prior art in which data C are sequentially stored from the lowest figure or from the highest figure and shifted for the number of times depending on the number of unnecessary figures.

Besides, in the above embodiments, the quotient register of the IC 111 on the divider-side can be omitted.

Figure 20:
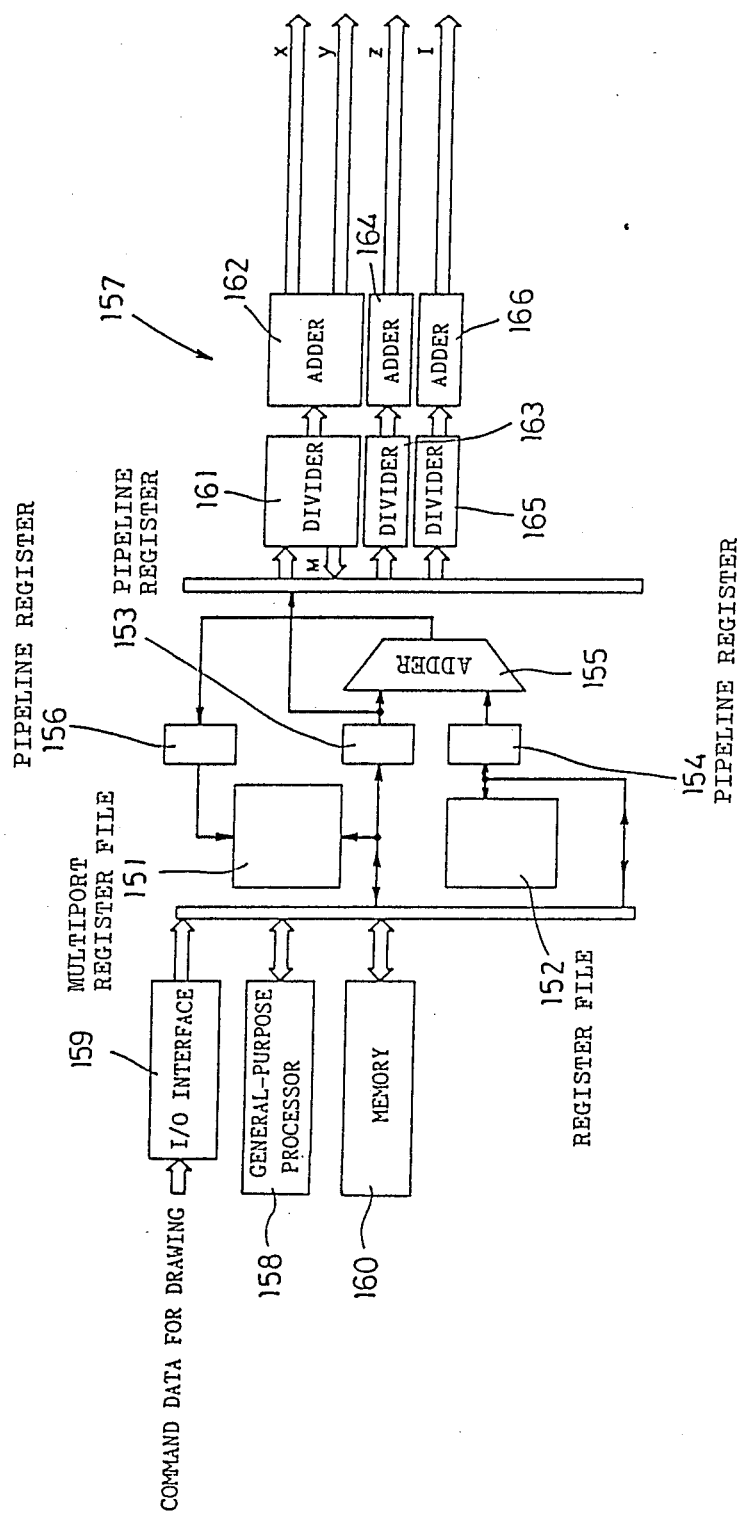
FIG. 20 is a block diagram of a portion of another embodiment of the polygon-filling apparatus.

FIG. 20 depicts a block diagram of a principal part of another embodiment of the polygon-filling apparatus.

In FIG. 20, a linear interpolation section comprises a multiport register file 151 to store an initial value or cumulatively added values, a register file 152 to store an incremental value, a first pipeline register 153 to temporarily store the content of the multiport register file 151, a second pipeline register 154 to temporarily store the content of the register file 152, an adder 155 to execute addition of contents inputted from the first and the second pipeline registers 153 and 154, and a third pipeline register 156 to temporarily store the added result. The content of the third pipeline register 156 is supplied to the first multiport register file 151, and the content of the first pipeline register 153 is supplied to a straight-line drawing section 157. To the multiport file 151 and the registr file 152, coordinate data and the like (coordinate data of an end point of a side along which a linear interpolation is performed and incremental data calculated based upon a length of a side) are supplied from a general-purpose processor 158.

Still more, an I/O interface 159 is provided for receiving drawing-command data, and a memory 160 is also provided. A divider 161 and an adder 162 for x-data and y-data, a divider 163 and a adder 164 for z-data, and a divider 165 and an adder 166 for I-data constitute a straight-line drawing section for generating pixel data which compose a segment based on linear interpolation data.

The operation of the polygon-filling apparatus of the above configuration is as follows:

Command data for filling a polygon is supplied to the general-purpose processor 158 through the I/O interface 159, and incremental data are obtained by division based on coordinates of end points of a side which composes a polygon. Thereafter the following processes are performed:

(1) Coordinate data of the above end points are stored in the multiport register file 151, and the incremental data are stored in the register file 152.

(2) Next, X-coordinate data in the multiport register file 151 are supplied to the first pipeline register 153, the incremental data in the register file 52 are supplied to the second pipeline register 154, and the content of the first pipeline register 153 is supplied to the straight-line drawing section.

(3) After that, the coordinate data and the incremental data are added together in the adder 155 in accordance with a content of the pipeline registers 153 and 154.

(4) The added results gained in the adder 155 are supplied to the third pipeline register 156.

(5) At last, the content of the third pipeline register 156 is stored in the multiport register file 151.

By performing the above-described series of operations, the incremental data are sequentially added to the coordinate data of the end point, so as to execute linear interpolation. The linear interpolation mentioned above has to be executed for the x-coordinate, y-coordinate, z-coordinate and I-coordinate of each side, so that the above series of operations must be performed for each of the coordinates.

In this case, after completing the above processes of steps (1) and (2) for the x-coordinate, data for x-coordinate do not have to be store in the pipeline registers 153 and 154, so that data for the y-coordinate can be stored in the multiport register file 152 and the register file 151, and thus stored data can be supplied to both pipeline registers 153 and 154.

When the above processes of steps (3) and (4) are completed for the x-coordinate, an addition can be executed in the adder 155 in accordance with data for the y-coordinate stored in both pipeline registers 153 and 154. In such condition where the addition is executed in the adder 155, data for the z-coordinate can be stored in the multiport register file 151 and the register file 152, and the above stored data can be supplied to both pipeline registers 153 and 154. After that, the above process of (5) can be performed.

Figure 21:
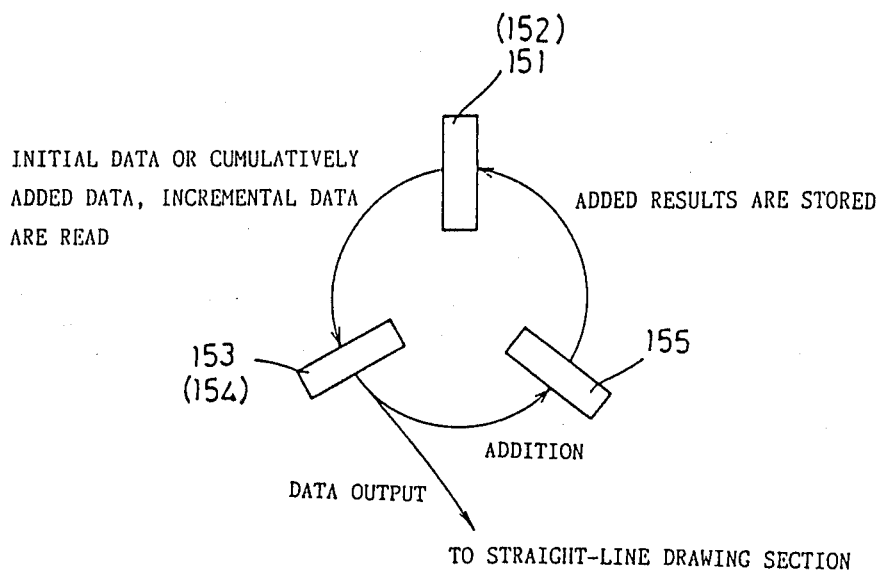
FIG. 21 is a diagram useful in understanding the linear interpolation.
Figure 22:
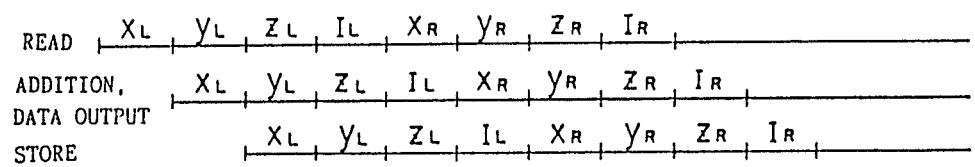
FIG. 22 is a timing diagram useful in understanding linear interpolation.

In conclusion, with reference to FIGS. 21 and 22, the operation of reading the initial data or cumulatively added data and reading the incremental data from the multiport register file 151 and the register fil 152, the operation of outputting data from the first pipeline register 153 to the straight-line drawing section and adding data in the adder 155, and the operation of storing the added result in the multiport register file 151 are sequentially performed in this order for each coordinate data in such a manner that the latter operation is delayed after the former operation by a time requirdd for performing one operation. Therefore, all the data are simultaneously obtained on the whole, and thereafter, linear interpolation and transmission of the interpolated data can be performed in almost the same time as in the prior art wherein the obtained data are serially supplied to a straight-line drawing section.

In the above embodiment, the division is executed in the general-purpose processor 158. Even in this case, the frequency of divisions in the linear interpolating operation of the ridge of a polygon is so small in the polygon-filling apparatus, and the required time for operation is not inconvenient.

FIG. 23 is a block diagram of another which differs from the former embodiment in that there are supplemented dividers 167 and 168 for linear interpolation on a texture plane to perform texture mapping and adders 169 and 170, a mapping memory 171 to store the added result outputted from the adders 169 and 170, and a multiplier 172 for a shading operation.

Therefore, in the embodiment described above, other than the x-, y-, z- and I-coordinate data, u- and v-coordinate data are sequentially interpolated in the liner interpolation section to obtain interpolated data, then the data are sequentially supplied to the dividers 161, 163, 165, 167 and 168, thereby desired graphic data on the texture plane with u- and v-coordinates can be dealt with in so-called texture mapping process, i.e., projected to a prescribed area on the display plane with x-, y-, z- and I-coordinates.

In the above embodiment, the multiport register file 151 can be substituted for a multiport memory, and the register file 152 can be substituted for a memory. In such a case the memories are divided into three areas or more, two of which store data for segments on the left-side and data for segments on the right-side, and the rest of which is used as a control area including area for discrimination for the sake of such as sectioning (e.g. the area stores flags of $z_1'$, ---, $z_n'$ for sectioning, as well as flags for x, y, z, u, v, and others), thereby time sharing control can be performed not only for the segments on both sides but also for the segment to be drawn, and a division for linear interpolation can be executed by a divider which is for exclusive use.

What we claim is:

1. A polygon-filling apparatus for use in a scanning display unit comprising:
a list memory to store corner number data and apex-data of a polygon, which data have been sequentially transferred thereto,
means to obtain a number of apexes of the polygon according to the apex-data, said apexes corresponding respectively to a maximal value and a minimal value along a direction perpendicular to a scanning line,
polygon discriminating means to discriminate, based upon said number of maximal and minimal values, whether the polygon is one which marks off one continuous lot on each scanning line or is one which is capable of marking off two or more continuous lots on each scanning line,
means to detect apexes from any other apex which corresponds to the maximum value and the minimum value of coordinates in a direction perpendicular to the scanning direction, respectively, based upon apex-data of a polygon which has been discriminated to mark off only one continuous lot on each scanning line by said polygon discriminating means,
means to alternatively generate ridge data on the left side and the right side on each scanning line by independently interpolating between data indicative of neighboring apexes chained along the left side and the right side of the polygon, respectively, from the apex having the maximum value to the apex having the minimum value, or generate ridge data on the left side and the right side on each scanning line by independently interpolating between data indicative of neighboring apexes chained along the left side and the right side of the polygon, respectively, from the apex having the minimum value to the apex having the maximum value, and
means to display the scanning line by filling a specific region on each scanning line between points where the scanning line intersects both ridge lines.

2. A polygon-filling apparatus according to claim 1, which further comprises crushing means to crush a polygon into one marking off one continuous lot on each scanning line when said polygon has been discriminated to be one capable of marking off two or more continuous lots on each scanning line.

3. A polygon-filling apparatus according to claim 1, which further comprises:
an up-counter and a down-counter, each having a radix equal to data indicative of the corner number of the polygon,
base pointer storing means to store a base pointer corresponding to a data area for each polygon stored in the list memory, and
adding means to add the base pointer to the counted value obtained in any one of said counters.

4. A polygon-filling apparatus according to claim 1, wherein said means to generate ridge data includes
a divider to calculate a gradient of each side of the polygon, and
an accumulator to cumulatively add the gradients which have been obtained in said divider.

5. A polygon-filling apparatus according to claim 1, wherein said means to create ridge data includes a processor to calculate a gradient corresponding to each side of the polygon, a multiport memory to store an initial value or cumulatively added values, a further memory to store the obtained value of the calculated gradients, registers to temporarily store the contents in said multiport memory and said further memory, adding means to add the contents in the registers together and provide a summation value therefrom, and another register to temporarily store the summation values from the adding means and supply the summation values to the multiport memory whereby, said content in the register which stores the content of the multiport memory is output as ridge data.

6. A polygon-filling apparatus according to claim 1, wherein said display means includes a divider for linear interpolation to execute division over such figures to prevent errors from arising in the integral part when cumulative addition is executed.

7. A polygon-filling apparatus according to claim 1, wherein said display means includes a divider for linear interpolation, said divider comprising:

a dividend register and a divisor register each being composed of shift registers, a subtracter to obtain a quotient by executing multiple trial subtractions based upon the contents of both registers, the subtractor providing a data size detection signal, controlling means to output a control signal which controls only one of the registers to operate as a shift register according to whether the register to be controlled to operate as a shift register contains smaller data as judged from the data-size detection signal from the subtracter.

8. A polygon-filling apparatus according to claim 1, wherein said display means includes an accumulator for linear interpolation to simultaneously obtain first accumulated data to which incremental data has been added and second accumulated data to which said incremental data has been added twice, the accumulator alternately outputting said first accumulated data and said second accumulated data.

9. A method of filling an interior of a polygon for use in a scanning display unit, said method comprising:

storing corner number data and apex-data of a polygon, which data have been sequentially transferred to a list memory, obtaining the number of apexes of the polygon according to the apex-data, said apexes corresponding respectively to a maximal value and a minimal value along a direction perpendicular to a scanning line, discriminating a polygon based upon said number of maximal and minimal values to discriminate whether the polygon which marks off one continuous lot on each scanning line, or one which is capable of marking off two or more continuous lots on each scanning line, detecting apexes from any other apex which corresponds to the maximum value and the minimum value of coordinates in a direction perpendicular to the scanning line, respectively, based upon apex-data of a polygon which has been discriminated to mark off only one continuous lot on each scanning line, alternatively generating ridge data on the left side and the right side on each scanning line by independently interpolating between data indicative of neighboring apexes chained along the left side and the right side of the polygon, respectively, from the apex having the maximum value to the apex having the minimum value, or generating ridge data on the left side and the right side on each scanning line by independently interpolating between data indicative of neighboring apexes chained along the left side and the right side of the polygon, respectively, from the apex having the minimum value to the apex having the maximum value, and filling a specific region of each scanning line between points where the scanning line intersects both ridge lines.

10. The method of filling an interior of a polygon according to claim 9, which further comprises crushing a polygon into one marking off one continuous lot on each scanning line when said polygon has been discriminated to be one capable of marking off two or more continuous lots on each scanning line.

* * * * *